(12) United States Patent
Rathinasamy et al.

(10) Patent No.: US 11,733,745 B2
(45) Date of Patent: Aug. 22, 2023

(54) PORT PROTECTION SYSTEM

(71) Applicant: Dell Products L.P., Round Rock, TX (US)

(72) Inventors: Shree Rathinasamy, Round Rock, TX (US); Maunish Shah, Austin, TX (US); David Piehler, Mountain View, CA (US)

(73) Assignee: Dell Products L.P., Round Rock, TX (US)

( * ) Notice: Subject to any disclaimer, the term of this patent is extended or adjusted under 35 U.S.C. 154(b) by 15 days.

(21) Appl. No.: 17/380,528

(22) Filed: Jul. 20, 2021

(65) Prior Publication Data
US 2023/0025382 A1    Jan. 26, 2023

(51) Int. Cl.
*G06F 1/18* (2006.01)
*G02B 6/42* (2006.01)
*H01R 13/52* (2006.01)
*H01R 13/453* (2006.01)

(52) U.S. Cl.
CPC ......... *G06F 1/182* (2013.01); *H01R 13/4536* (2013.01); *H01R 13/5213* (2013.01); *G02B 2006/4297* (2013.01)

(58) Field of Classification Search
CPC ............................. G06F 1/182; H01R 13/5213
See application file for complete search history.

(56) References Cited

U.S. PATENT DOCUMENTS

| | | | | |
|---|---|---|---|---|
| 6,666,724 B1* | 12/2003 | Lwee | ................... | G06K 7/0043 |
| | | | | 439/138 |
| 9,695,879 B2* | 7/2017 | Sasaki | ................ | G03G 21/1652 |
| 9,859,646 B2* | 1/2018 | Ueda | ..................... | H01R 12/71 |
| 2004/0142589 A1* | 7/2004 | Caveney | ............ | H01R 13/4536 |
| | | | | 439/138 |
| 2006/0250778 A1* | 11/2006 | Yamamoto | ............. | G06K 13/08 |
| | | | | 361/737 |

(Continued)

OTHER PUBLICATIONS

Amazon.com, "RJ45 Dust Cover and Blockout Device 100-Pack—Protects Network Jack, Cap Ethernet Port, Switch Interface, Keystone Wall Plate," 2 pages, retrieved from the Internet, URL: https://www.amazon.com/RJ45-Cover-Blockout-Device-100-Pack/dp/B074F4D4GR on Jul. 20, 2021.

*Primary Examiner* — Michael C Zarroli
(74) *Attorney, Agent, or Firm* — Joseph Mencher

(57) ABSTRACT

A port protection device includes a blocking element movement subsystem that may be coupled to a port that defines a port entrance, and a port entrance blocking element connected to the blocking element movement subsystem and defining airflow aperture(s). When the blocking element movement subsystem is coupled to the port, the blocking element movement subsystem allows the port entrance blocking element to be positioned in a port protection orientation immediately adjacent the port entrance such that airflow is restricted to entering the port via the airflow aperture(s). When the blocking element movement subsystem is coupled to the port, the blocking element movement subsystem also allows the port entrance blocking element to move from the port protection orientation to a cable connector orientation in response to engagement with a cable connector so that the cable connector may move through the port entrance to connect to the port.

20 Claims, 29 Drawing Sheets

(56) References Cited

U.S. PATENT DOCUMENTS

| | | | |
|---|---|---|---|
| 2007/0047881 A1* | 3/2007 | Mizuno | G02B 6/4292 385/88 |
| 2014/0131356 A1* | 5/2014 | Hachadorian | H01R 13/5213 220/242 |
| 2014/0139981 A1* | 5/2014 | Kuo | G06F 1/1656 361/679.01 |

* cited by examiner

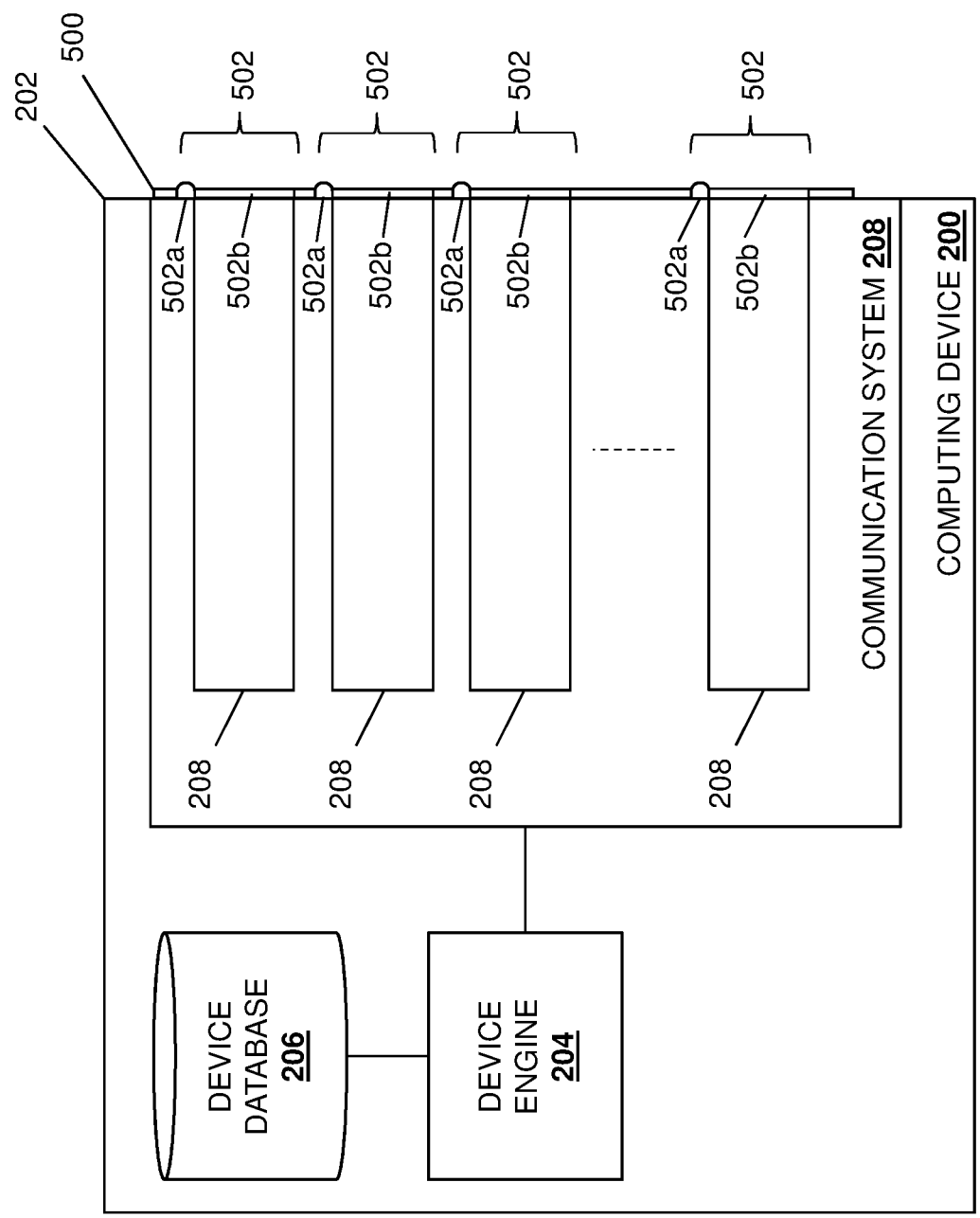

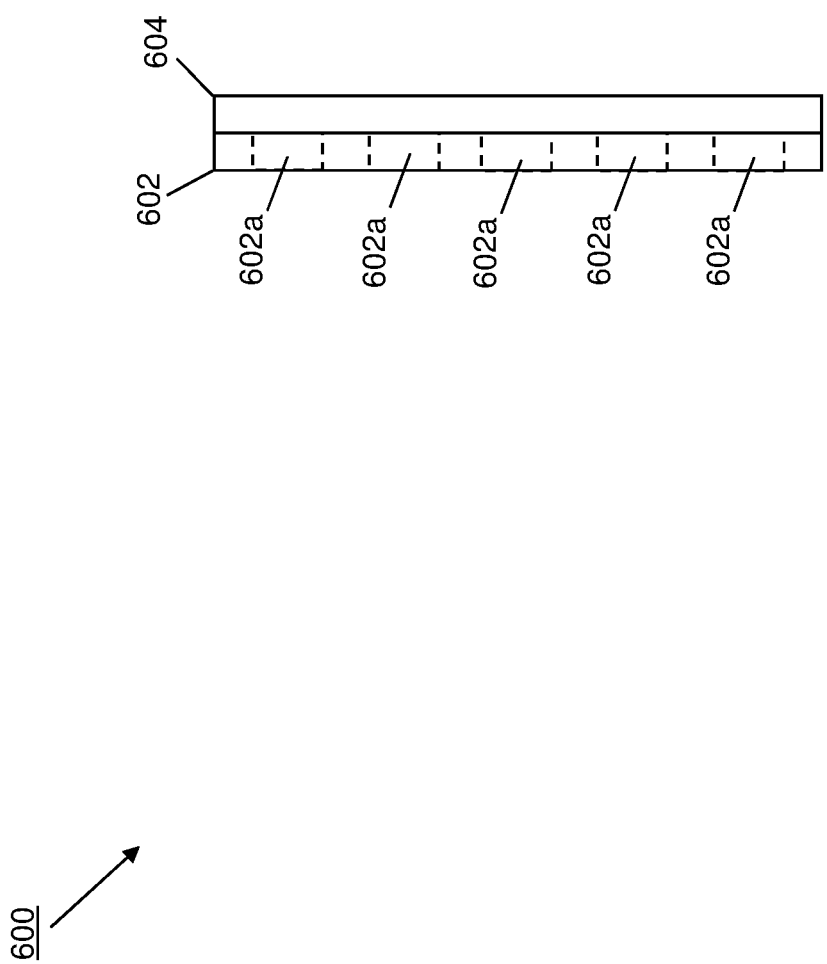

PORT PROTECTION SYSTEM

BACKGROUND

The present disclosure relates generally to information handling systems, and more particularly to protecting ports on an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices include ports that connect to other devices via cabling and, in some situations, transceiver devices. As switch devices and transceiver devices connected thereto operate at higher speeds and temperatures, the fan systems in the switch devices is relied upon more and more to cool those components by pulling more and more air through the ports. Furthermore, in many datacenter situations, some subset of switch devices will include some subset of ports that are not connected to another device via a cable and/or transceiver device (particularly in situations where switch devices are added to the datacenter to allow for future scaling of the datacenter). While ports on switch devices that include a connected cable and/or transceiver device are protected from the surrounding environment that may include dust, metal particles, moisture, corrosive particles, and/or other contaminants, ports on switch devices that do not include a connected cable and/or transceiver device will be open to the environment and subject to those contaminants that may be drawn into those ports and the switch device via a fan system that is used to cool that switch device. As will be appreciated by one of skill in the art in possession of the present disclosure, such contaminants can result in increases in port failure rates, reductions in the ability of ports to dissipate heat, reductions in switch device lifespans, data losses, increases in customer support calls and associated costs, and/or other issues known in the art.

Accordingly, it would be desirable to provide a port protection system that addresses the issues discussed above.

SUMMARY

According to one embodiment, an Information Handling System (IHS) includes a chassis; a processing system that is included in the chassis; a plurality of ports that are included on the chassis, coupled to the processing system, and that each define a respective port entrance; and a respective port protection device coupled to each of the plurality of ports, wherein each port protection device includes: a blocking element movement subsystem; and a port entrance blocking element that is connected to the blocking element movement subsystem and that defines at least one airflow aperture, wherein the blocking element movement subsystem is configured to allow the port entrance blocking element to: be positioned in a port protection orientation immediately adjacent the port entrance defined by the port to which that port protection device is coupled such that airflow is restricted to entering that port via the at least one airflow aperture; and move, in response to a cable connector engaging the port entrance blocking element and moving through the port entrance defined by the port to which that port protection device is coupled and into that port, from the port protection orientation to a cable connector orientation that allows the cable connector to connect to that port.

BRIEF DESCRIPTION OF THE DRAWINGS

FIG. 5B is a schematic view illustrating an embodiment of a port on the computing device of FIG. 5A including the port protection system of the present disclosure.

FIG. 6B is a cross-sectional view illustrating an embodiment of the port entrance blocking element of FIG. 6A.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
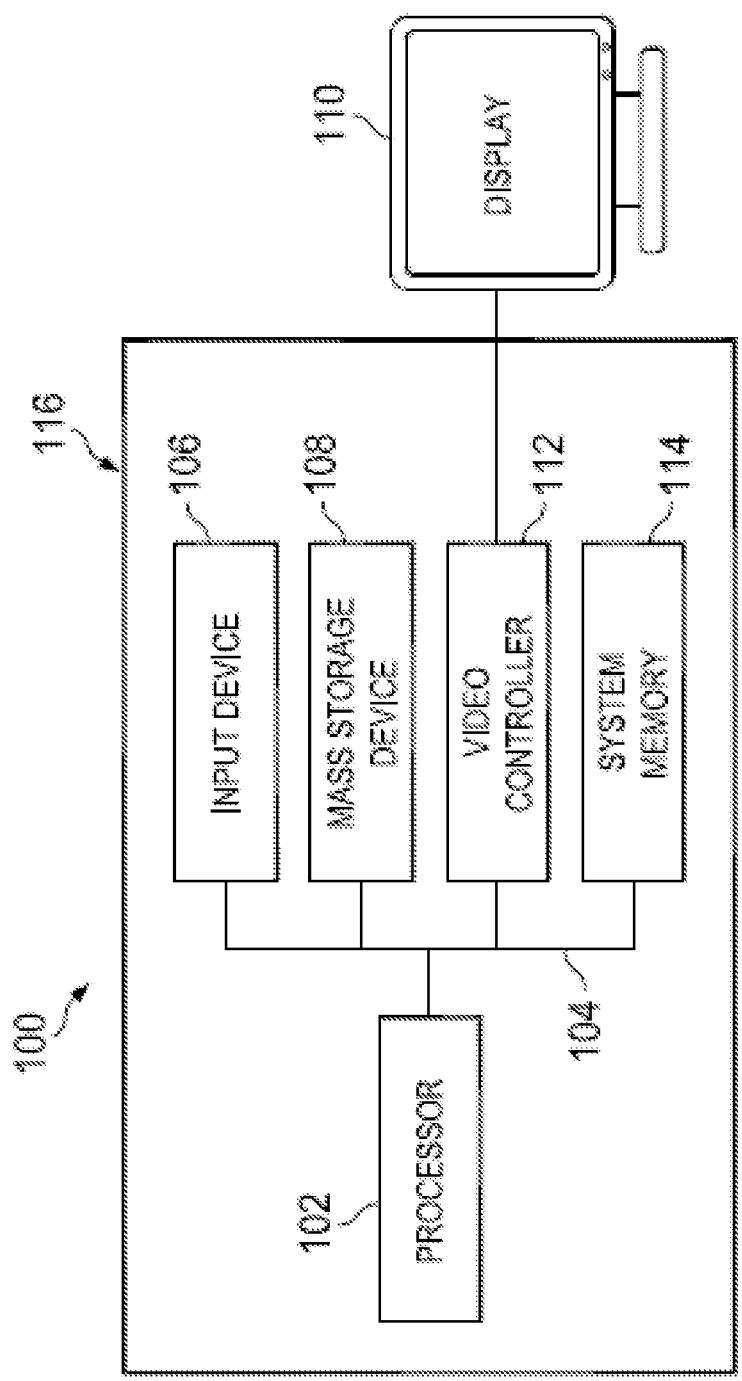
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
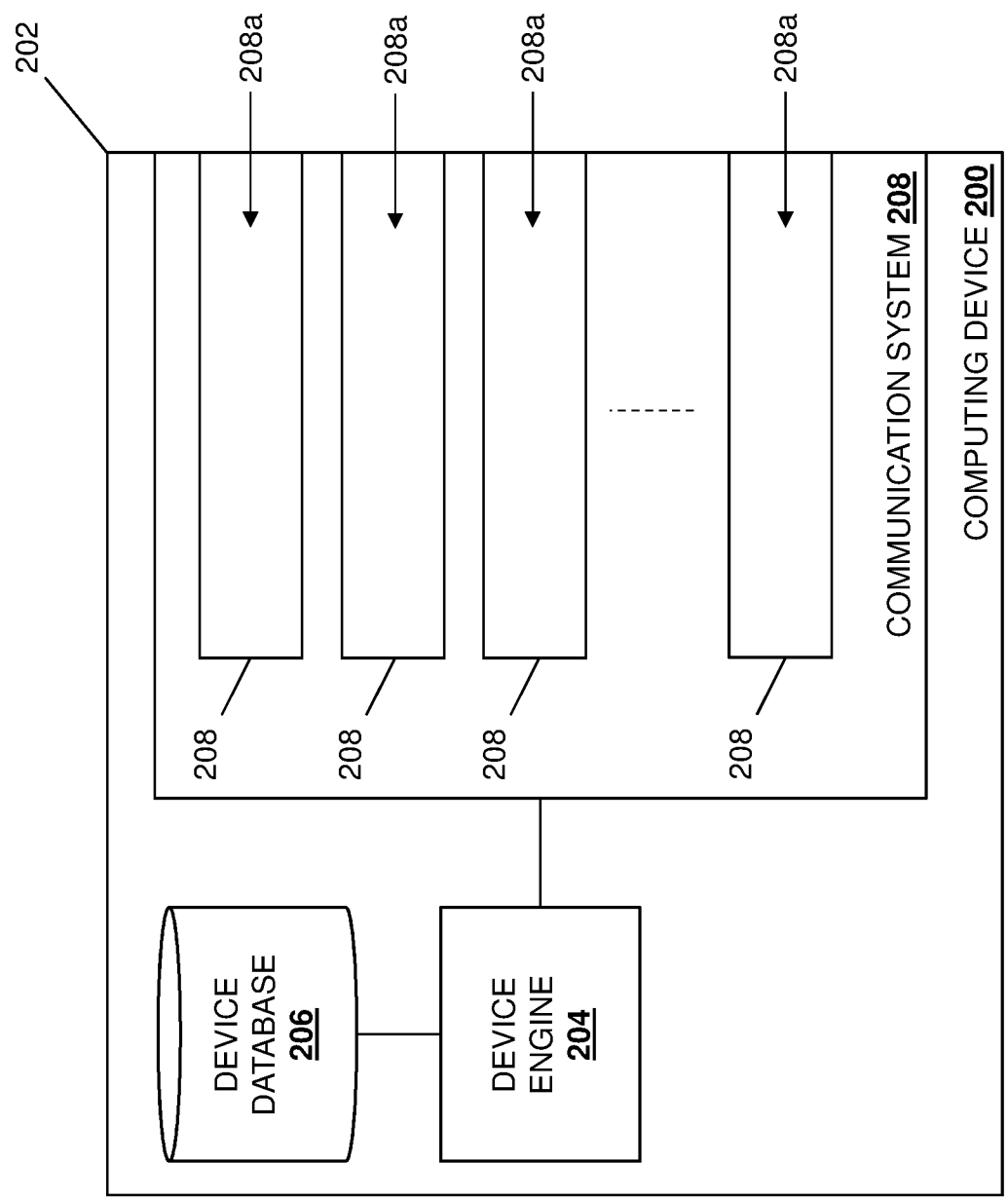
FIG. 2A is a schematic view illustrating an embodiment of a computing device.
Figure 2B:
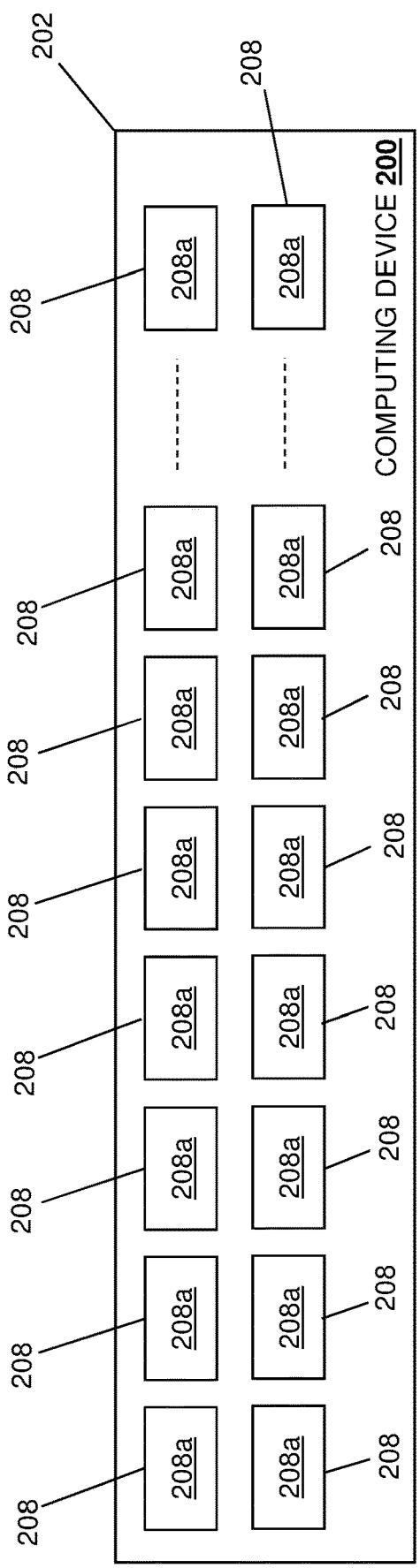
FIG. 2B is a schematic front view illustrating an embodiment of the computing device of FIG. 2A.

Referring now to FIGS. 2A and 2B, an embodiment of a computing device 200 is illustrated that may have the port protection system of the present disclosure integrated, or may have the port protection system of the present disclosure connected to it, different embodiments of which are described in further detail below. In an embodiment, the computing device 200 may be provided by the IHS 100 discussed above with reference to FIG. 1 and/or may include some or all of the components of the IHS 100, and in specific examples below is described as being provided by a networking device such as a switch device. However, while illustrated and discussed as being provided by a switch device in the specific examples below, one of skill in the art in possession of the present disclosure will recognize that the functionality of the computing device 200 discussed below may be provided by other computing devices that are configured to operate similarly as the computing device 200 discussed below. In the illustrated embodiment, the computing device 200 includes a chassis 202 that houses the components of the computing device 200, only some of which are illustrated and discussed below. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a device engine 204 that is configured to perform any of a variety of computing functionality (e.g., switching functionality) for the computing device 200 that would be apparent to one of skill in the art in possession of the present disclosure.

The chassis 202 may also house a storage system (not illustrated, but which may include the storage 108 discussed above with reference to FIG. 1) that is coupled to the device engine 204 (e.g., via a coupling between the storage system and the processing system) and that includes a device database 206 that is configured to store any of the information utilized by the device engine 204 discussed below. The chassis 202 may also house a communication system 208 that is coupled to the device engine 204 (e.g., via a coupling between the communication system 208 and the processing system) and that may be provided by a Network Interface Controller (NIC), wireless communication systems (e.g., BLUETOOTH®, Near Field Communication (NFC) components, WiFi components, cellular components etc.), and/ or any other communication components that would be apparent to one of skill in the art in possession of the present disclosure. In the specific example illustrated in FIGS. 2A and 2B, the communication system 208 includes a plurality of ports 208 that each define a respective port entrance 208a, and while FIG. 2A illustrates the ports 208 schematically in a vertical stack, FIG. 2B illustrates a more conventional two-row stack of the ports 208 (e.g., 16 ports per row to provide a total of 32 ports). However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3A:
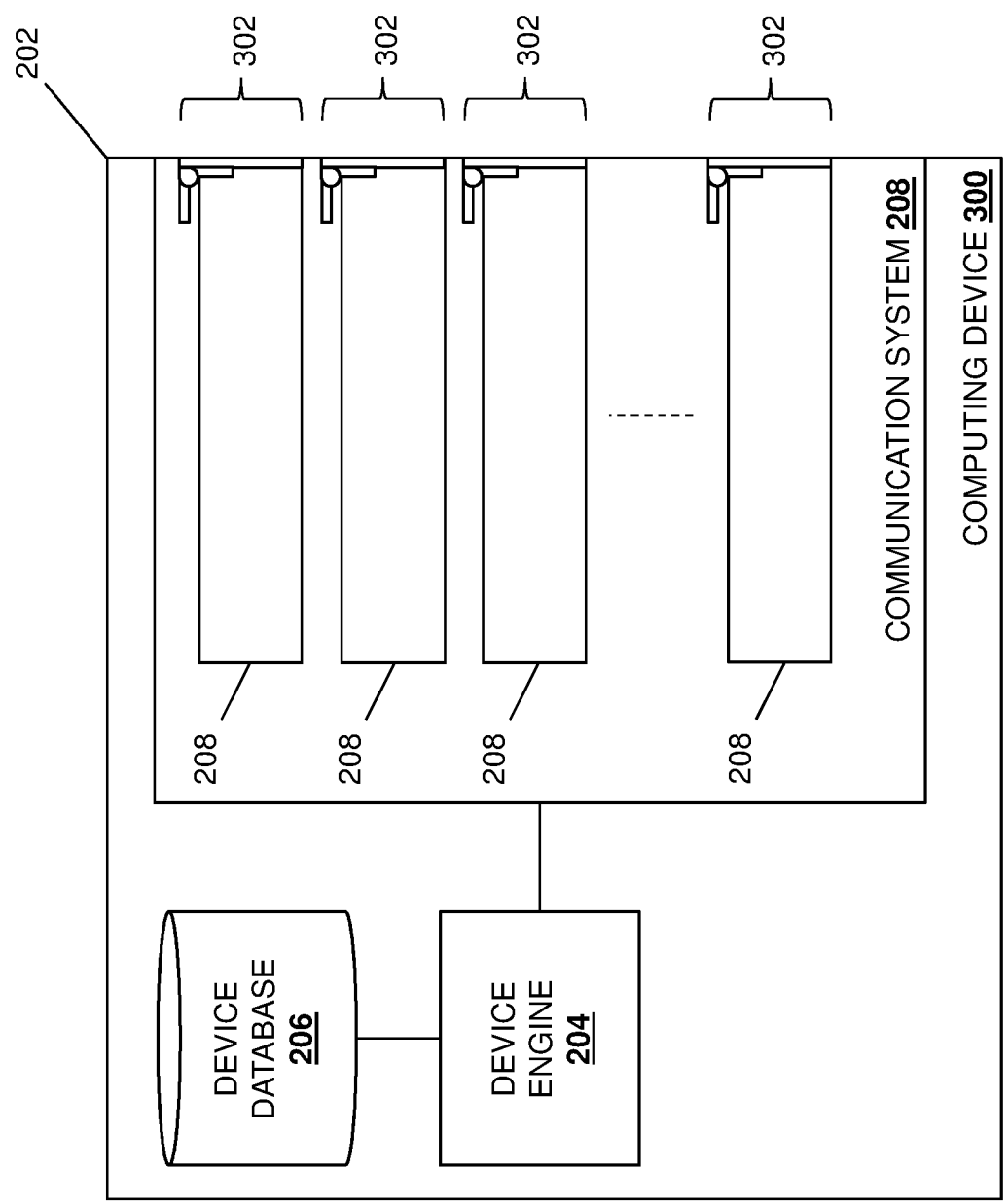
FIG. 3A is a schematic view illustrating an embodiment of a computing device including the port protection system of the present disclosure.
Figure 3B:
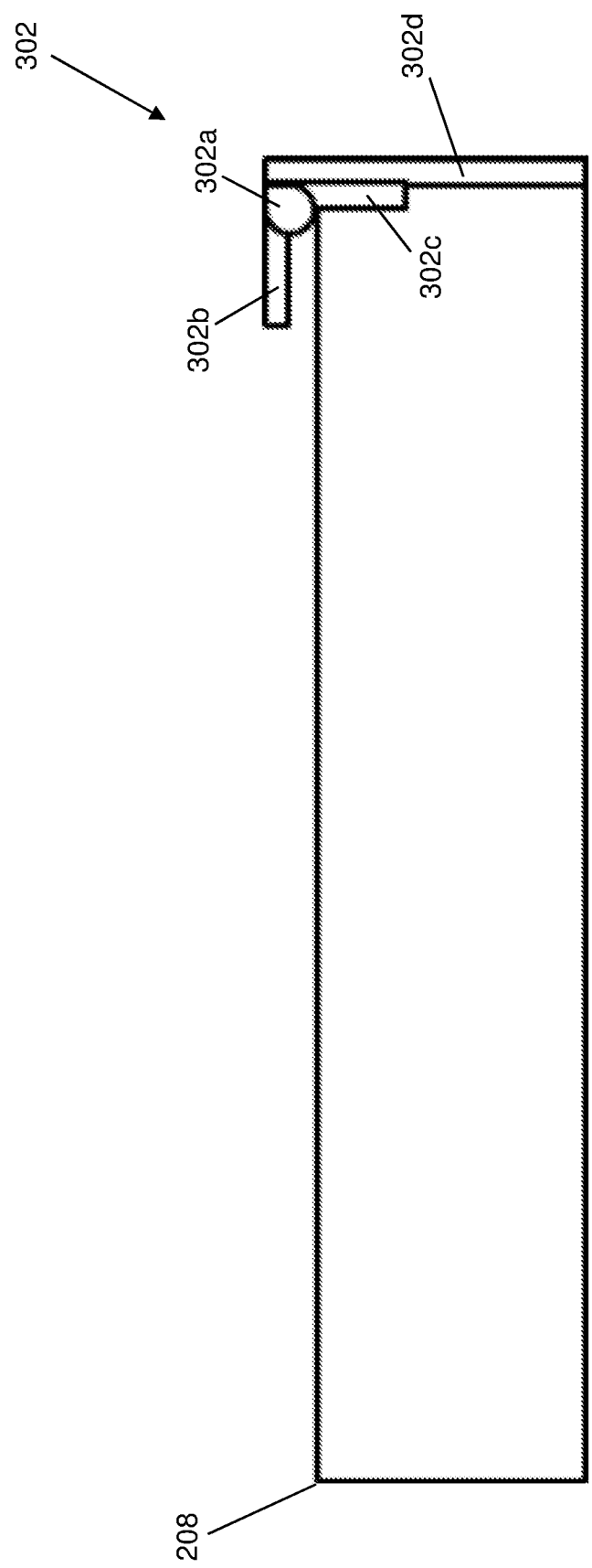
FIG. 3B is a schematic view illustrating an embodiment of a port on the computing device of FIG. 3A including the port protection system of the present disclosure.
Figure 3C:
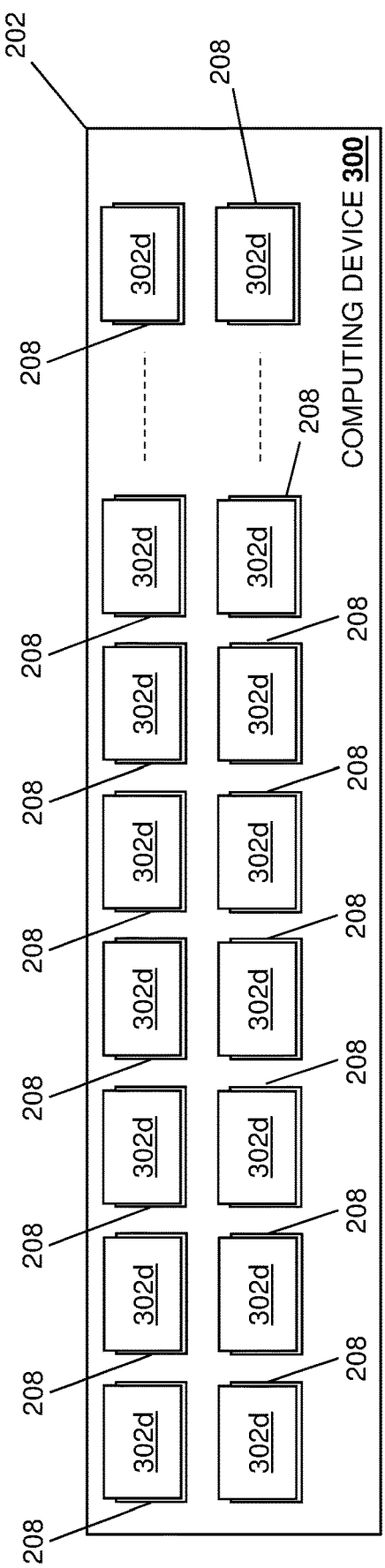
FIG. 3C is a schematic view illustrating an embodiment of the computing device of FIG. 3A including the port protection system of the present disclosure.

Referring now to FIGS. 3A, 3B, and 3C, an embodiment of a computing device 300 is illustrated that is substantially similar to the computing device 200 discussed above with reference to FIGS. 2A and 2B (with similar components including the same element numbers), while also having the port protection system of the present disclosure integrated as part of the computing device 300. For example, the port protection system of the present disclosure may be integrated in the computing device 300 of FIGS. 3A-3C by providing a respective port protection device 302 with each of the plurality of ports 208. As illustrated in FIG. 3B, the port protection device 302 integrated with each port 208a may include a blocking element movement subsystem that includes a moveable coupling 302a (e.g., a hinge), a chassis mounting element 302b that extends from the moveable coupling 302a and that may be mounted to the chassis 202 adjacent each port 208, and a blocking element mounting element 302c that extends from the moveable coupling 302a. The port protection device 302 also includes a port entrance blocking element 302d that is mounted to the blocking element mounting element 302c in the blocking element movement subsystem. As will be appreciated by one of skill in the art in possession of the present disclosure, any of the moveable coupling 302a, the chassis mounting element 302b, the blocking element mounting element 302c, and/or the port entrance blocking element 302d on the port protection devices 302 may be manufactured from plastic materials or other materials with relatively safe electrostatic discharge (ESD) properties.

In the embodiment illustrated in FIGS. 3A-3C, the port entrance blocking element 302d is provided in a port protection orientation in which the port entrance blocking element 302d is positioned in the port entrance 208a of the port 208. As discussed in further detail below, the port protection device 302 may be configured to allow the port entrance blocking element 302d to move into the port protection orientation in response to gravitation force, and thus the port entrance blocking element 302d, the blocking element mounting element 302c, and/or the moveable coupling 302a may be configured (e.g., weight, friction, etc.) to ensure that gravitational force will bias the port entrance blocking element 302d into the port protection orientation illustrated in FIGS. 3A-3C. For example, the end of the port entrance blocking element 302d may be configured to be heavier than the rest of the port entrance blocking element 302d, and the moveable coupling 302a may be configured with a rotational friction that allows the force of gravity to position the port entrance blocking element 302d in the port protection orientation in the absence of an outside force, and return the port entrance blocking element 302d to the port protection orientation upon removal of any outside force that had moved it from the port protection orientation.

Furthermore, while FIG. 3C illustrates a gap between each port entrance blocking element 302d and its corresponding port 208 (e.g., to allow airflow through that port 208), as discussed below the port entrance blocking element 302d may include airflow apertures for allowing airflow through its corresponding port 208, and thus the gap illustrated between the port entrance blocking element 302d and its corresponding port 208 may be omitted (e.g., a seal may exist between the port entrance blocking element 302d and its corresponding port 208 when the port entrance blocking element 302d is in the port protection orientation). Furthermore, one of skill in the art in possession of the present disclosure will appreciate how the ports 208 and the port protection devices 302 may be configured in a variety of manners in order to allow the port protection devices 302 to move relative to their corresponding ports 208 from the port protection orientation to the cable connector orientation, as discussed in further detail below.

Figure 4A:
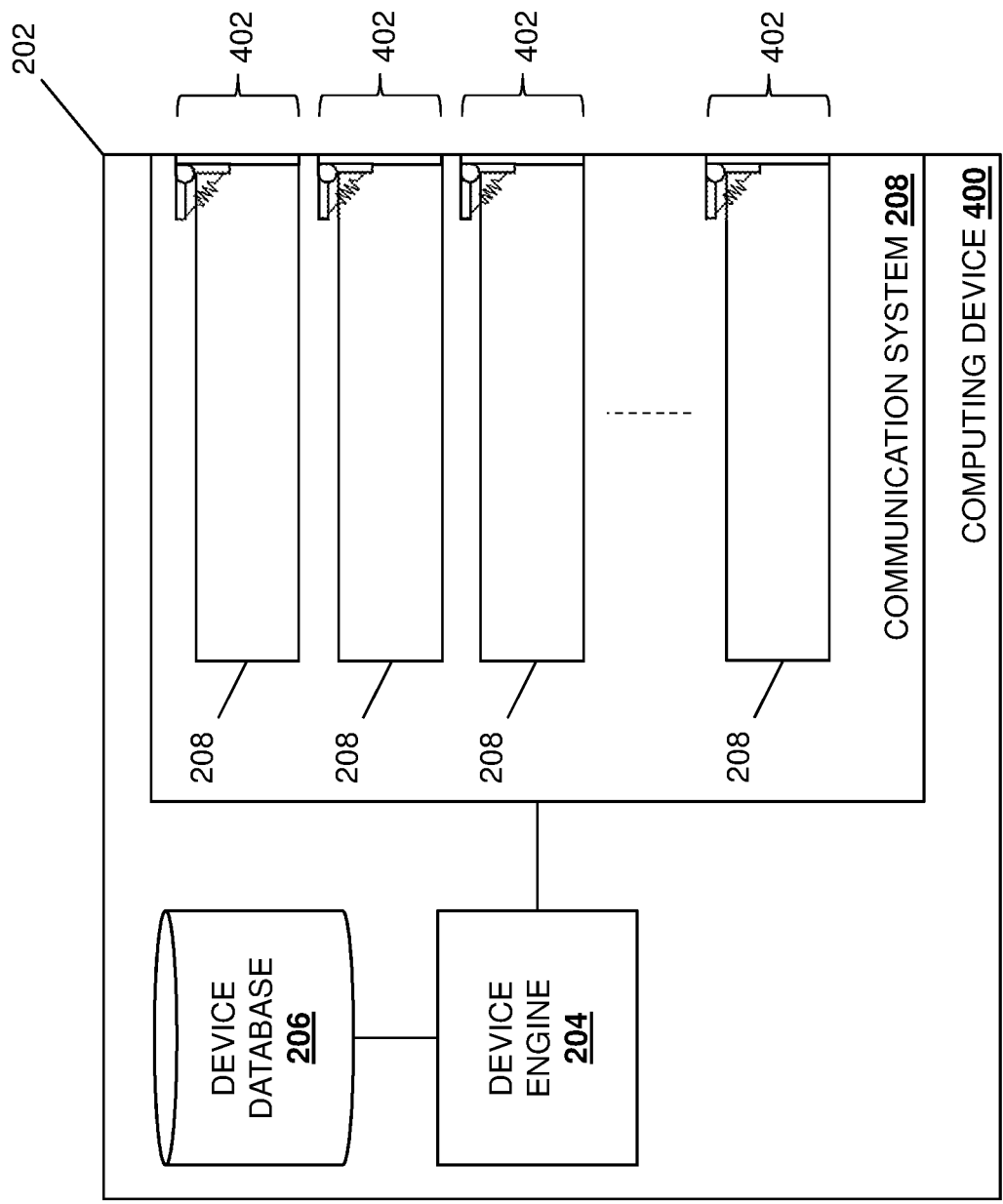
FIG. 4A is a schematic view illustrating an embodiment of a computing device including the port protection system of the present disclosure.
Figure 4B:
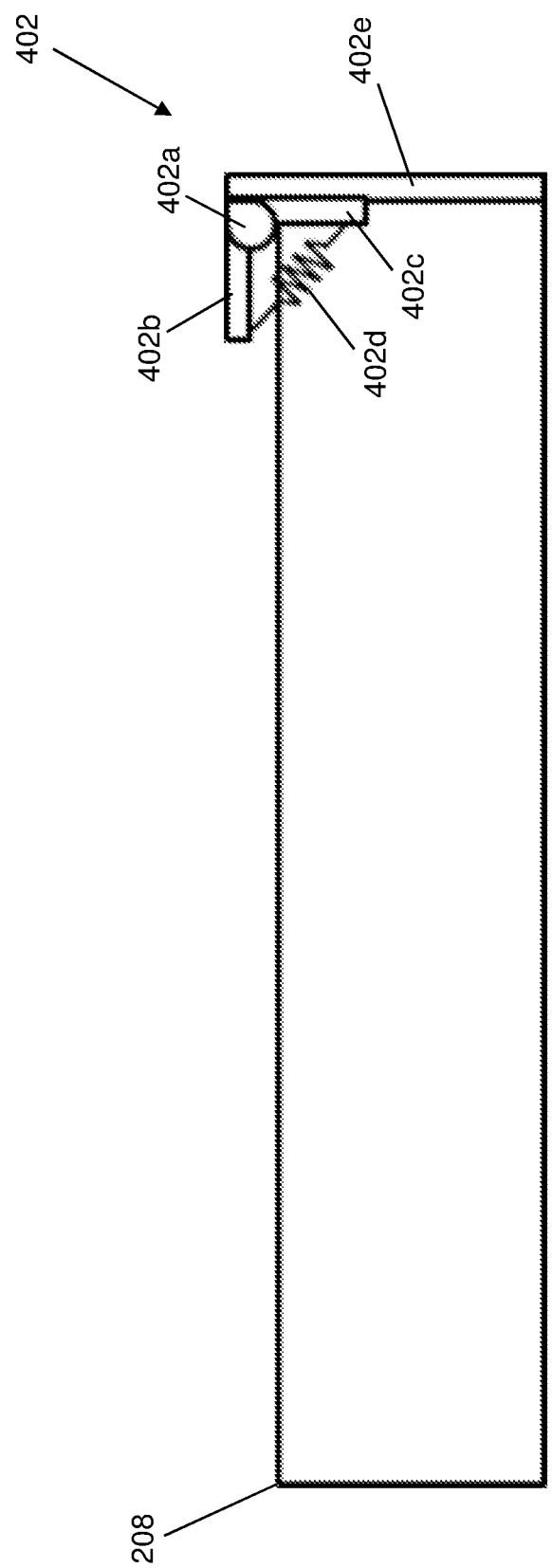
FIG. 4B is a schematic view illustrating an embodiment of a port on the computing device of FIG. 4A including the port protection system of the present disclosure.
Figure 4C:
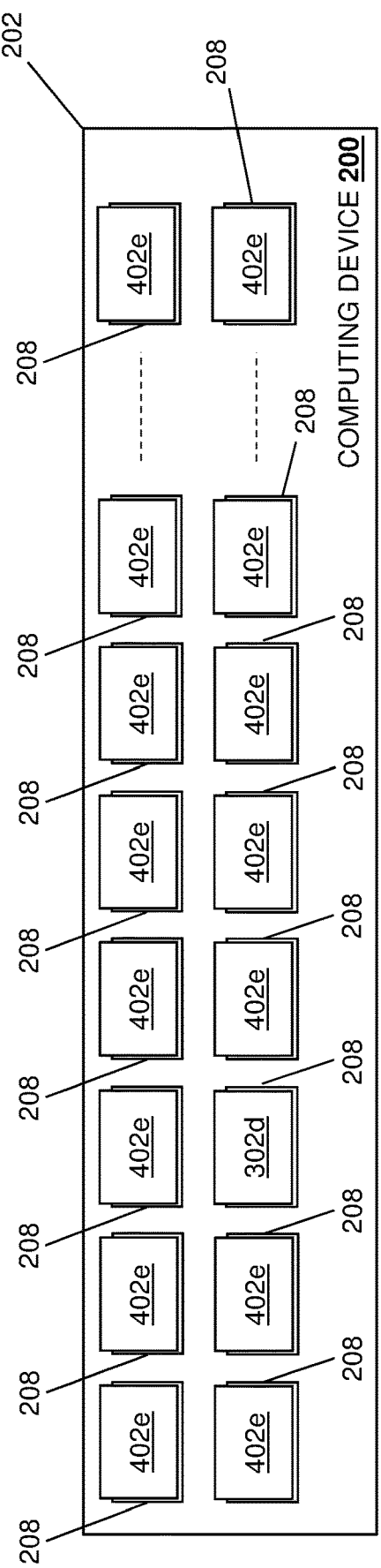
FIG. 4C is a schematic view illustrating an embodiment of the computing device of FIG. 4A including the port protection system of the present disclosure.

Referring now to FIGS. 4A, 4B, and 4C, an embodiment of a computing device 400 is illustrated that is substantially similar to the computing device 200 discussed above with reference to FIGS. 2A and 2B (with similar components including the same element numbers), while also having the port protection system of the present disclosure integrated as part of the computing device 400. For example, the port protection system of the present disclosure may be integrated in the computing device 400 of FIGS. 4A-4C by providing a respective port protection device 402 with each of the plurality of ports 208. As illustrated in FIG. 4B, the port protection device 402 integrated with each port 208 may include a blocking element movement subsystem that includes a moveable coupling 402a (e.g., a hinge), a chassis mounting element 402b that extends from the moveable coupling 402a and that may be mounted to the chassis 202 adjacent each port 208, a blocking element mounting element 402c that extends from the moveable coupling 402a, and a spring device 402d (e.g., a spring, a spring-loaded pin, and/or other resilient members known in the art) connected to each of the chassis mounting element 402b and the blocking element mounting element 402c. The port protection device 402 also includes a port entrance blocking element 402e that is mounted to the blocking element mounting element 402c in the blocking element movement subsystem. As will be appreciated by one of skill in the art in possession of the present disclosure, any of the moveable coupling 402a, the chassis mounting element 402b, the blocking element mounting element 402c, the spring device 402d, and/or the port entrance blocking element 402e on the port protection devices 402 may be manufactured from plastic materials or other materials with relatively safe electrostatic discharge (ESD) properties.

In the embodiment illustrated in FIGS. 4A-4C, the port entrance blocking element 402e is provided in a port protection orientation in which the port entrance blocking element 402e is positioned in the port entrance 208a of the port 208. As discussed in further detail below, the port protection device 402 may be configured to allow the port entrance blocking element 402e to move into the port protection orientation in response to the spring force provided by the spring device 402d, and thus the port entrance blocking element 402e, the blocking element mounting element 402c, the moveable coupling 402a, and/or the spring device 402d may be configured (e.g., weight, friction, spring force etc.) to ensure that the spring force will bias the port entrance blocking element 402e into the port protection orientation illustrated in FIGS. 4A-4C. For example, the port entrance blocking element 402e and the blocking element mounting element 402c may be configured with weights/weight distributions, the moveable coupling 402a may be configured with a rotational friction, and/or the spring device 402d may be configured with a spring force that provides for the positioning of the port entrance blocking element 402e in the port protection orientation in the absence of an outside force, and the return of the port entrance blocking element 402e to the port protection orientation upon removal of any outside force that moved it from the port protection orientation.

Furthermore, while FIG. 4C illustrates a gap between each port entrance blocking element 402e and its corresponding port 208 (e.g., to allow airflow through that port 208), as discussed below the port entrance blocking element 402e may include airflow apertures for allowing airflow through its corresponding port 208, and thus the gap illustrated between the port entrance blocking element 402e and its corresponding port 208 may be omitted (e.g., a seal may exist between the port entrance blocking element 402e and its corresponding port 208 when the port entrance blocking element 402e is in the port protection orientation). As such, one of skill in the art in possession of the present disclosure will appreciate how the ports 208 and the port protection devices 402 may be configured in a variety of manners in order to allow the port protection devices 402 to move relative to their corresponding ports 208 from the port protection orientation to the cable connector orientation, as discussed in further detail below.

Figure 5A:
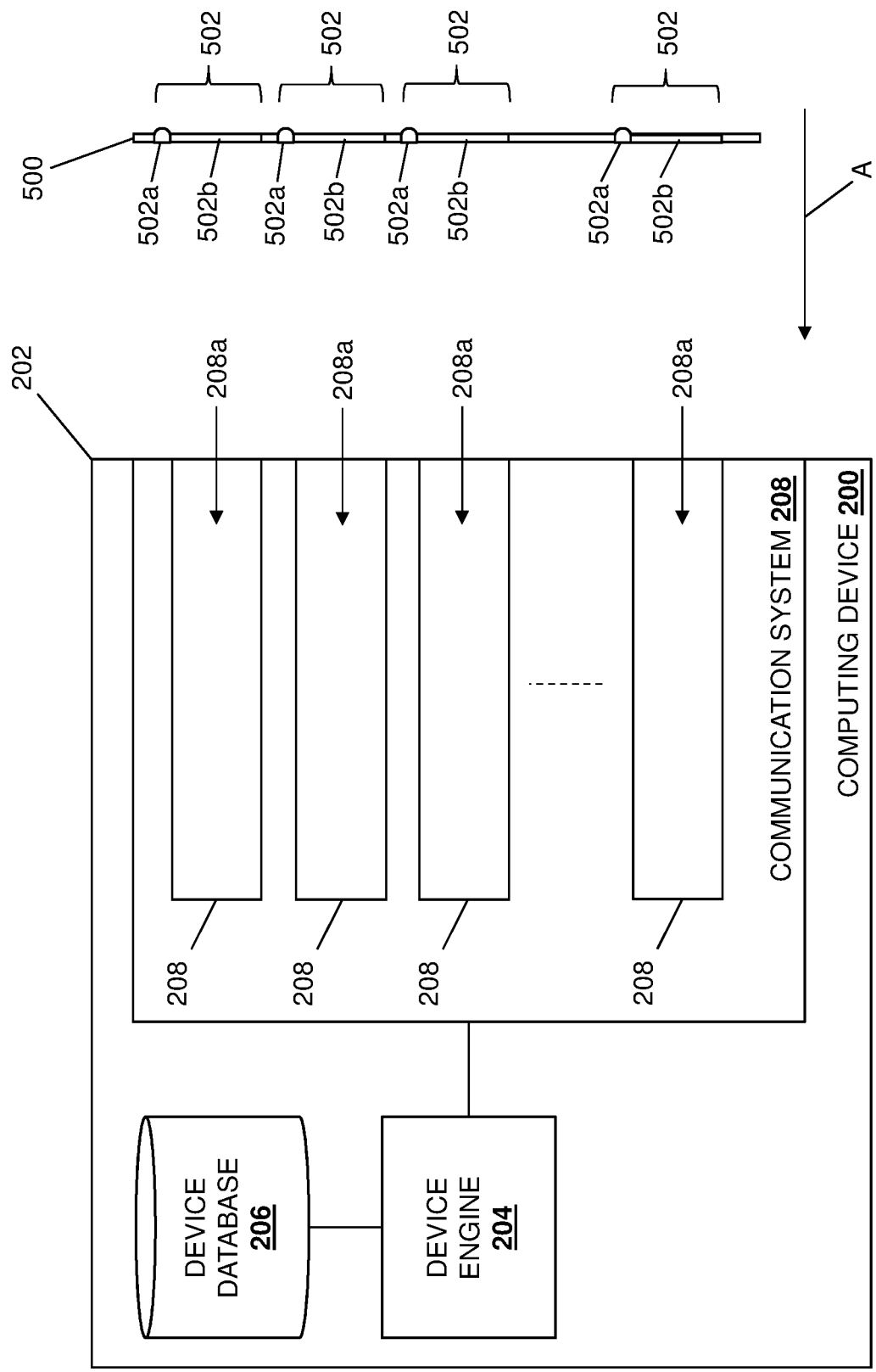
FIG. 5A is a schematic view illustrating an embodiment of the computing device of FIGS. 2A and 2B including the port protection system of the present disclosure.
Figure 5C:
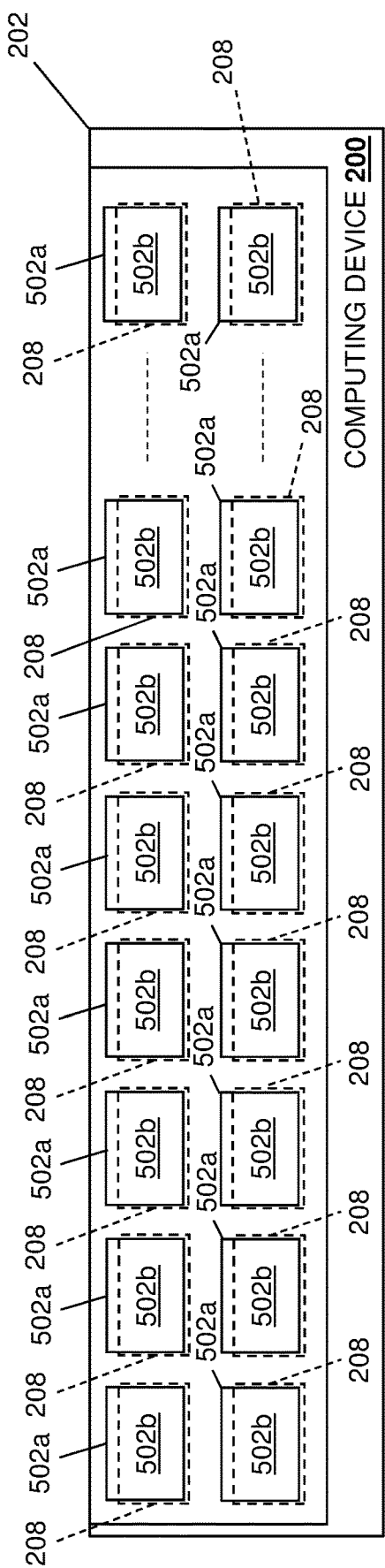
FIG. 5C is a schematic view illustrating an embodiment of the computing device of FIG. 5A including the port protection system of the present disclosure.

Referring now to FIGS. 5A, 5B, and 5C, an embodiment of the computing device 200 is illustrated that may be connected to the port protection system of the present disclosure. For example, the port protection system of the present disclosure may be connected or otherwise coupled to the computing device 200 of FIGS. 2A and 2B to provide a respective port protection device adjacent each of the plurality of ports 208. As illustrated in FIG. 5A, the port protection system may include a base 500 having respective port protection devices 502 for each port 208 on the computing device 200, and may include a blocking element movement subsystem that includes a respective moveable coupling 502a (e.g., a hinge) for each port protection device 502. The port protection device 502 may also include a respective port entrance blocking element 502b that extends from each moveable coupling 502a in the blocking element movement subsystem. While not explicitly illustrated in FIGS. 5A-5C, the port protection system illustrated in FIGS. 5A-5C may be configured to utilize gravitation force or spring forces like those discussed above with reference to the port protection systems of FIG. 3A-3C or 4A-4C while remaining within the scope of the present disclosure. As will be appreciated by one of skill in the art in possession of the present disclosure, any of the base 500, the moveable coupling 502a, and/or the port entrance blocking element 502b on the port protection devices 502 may be manufactured from plastic materials or other materials with relatively safe electrostatic discharge (ESD) properties.

As can be seen in FIGS. 5A-5C, the base 500 may be moved in the direction A to engage the chassis 202 (e.g., by engaging coupling features on the base 500 and the chassis 202, not illustrated) such that a respective port protection device 502 is located adjacent each port 208 on the computing device 200. FIGS. 5B and 5C illustrate the base 500 connected to the chassis 202 with each port protection device 502 in a port protection orientation in which the port entrance blocking element 502b is positioned in the port entrance 208a of the port 208 to which it is adjacent. As discussed in further detail below, the moveable coupling 502a may operate based on the gravitational forces or spring forces discussed above to position/bias the port entrance blocking element 502b into the port protection orientation, and thus the port entrance blocking element 502b and/or the moveable coupling 502a may be configured (e.g., weight, friction, spring force, etc.) such that the port entrance blocking element 502b is biased into the port protection orientation illustrated in FIGS. 5B and 5C.

Furthermore, while FIG. 5C illustrates a gap between each port entrance blocking element 502b and its corresponding port 208 (e.g., to allow airflow through that port 208), as discussed below the port entrance blocking element 502b may include airflow apertures for allowing airflow through its corresponding port 208, and thus the gap illustrated between the port entrance blocking element 502b and its corresponding port 208 may be omitted (e.g., a seal may exist between the port entrance blocking element 502b and its corresponding port 208 when the port entrance blocking element 502b is in the port protection orientation). As such, one of skill in the art in possession of the present disclosure will appreciate how the ports 208 and the port protection devices 502 may be configured in a variety of manners in order to allow the port protection devices 502 to move relative to their corresponding ports 208 from the port protection orientation to the cable connector orientation, as discussed in further detail below.

Figure 6A:
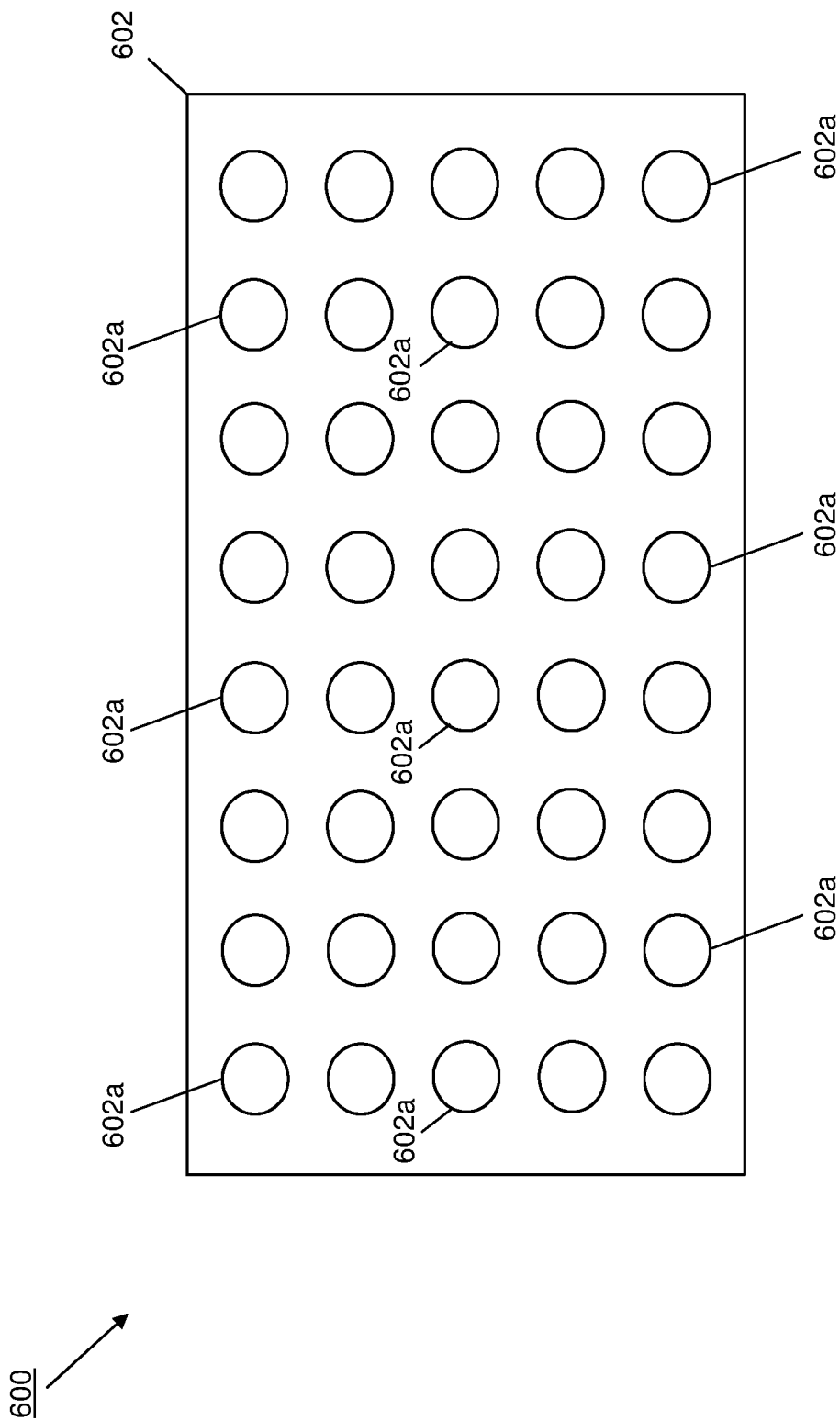
FIG. 6A is a front view illustrating an embodiment of a port entrance blocking element that may be included on the port protection system of the present disclosure.

Referring now to FIGS. 6A and 6B, an embodiment of a port entrance blocking element 600 is illustrated that may provide any of the port entrance blocking elements 302d discussed above with reference to FIGS. 3A-3C, the port entrance blocking elements 402e discussed above with reference to FIGS. 4A-4C, and/or the port entrance blocking elements 502b discussed above with reference to FIGS. 5A-5C. In the illustrated embodiment, the port entrance blocking element 600 may include a base 602 that defines a plurality of circular airflow apertures 602a through its width (which is into the page in FIG. 6A), with the circular airflow apertures 602a configured to allow an airflow to enter a port 208 when the port entrance blocking element 600 is positioned in the port protection orientation, discussed above and in further detail below. FIG. 6B illustrates how the port entrance blocking element 600 may include an airflow filter 604 that may be positioned adjacent the base 602 such that any airflow through the circular airflow apertures 602a is filtered by the airflow filter 604. However, one of skill in the art in possession of the present disclosure will appreciate how the airflow filter 604 may be omitted in some embodiments while remaining within the scope of the present disclosure as well. In either embodiment, one of skill in the art in possession of the present disclosure will appreciate how the circular airflow apertures 602a and/or airflow filters 604 may be configured to allow an airflow through the ports 208 (e.g., when the port protection devices that utilize the port entrance blocking elements 600 are in the port protection orientation) that is sufficient to provide a desired level of cooling for one or more components in the computing device that include those ports 208 while also restricting contaminants from entering the ports 208.

Figure 7A:
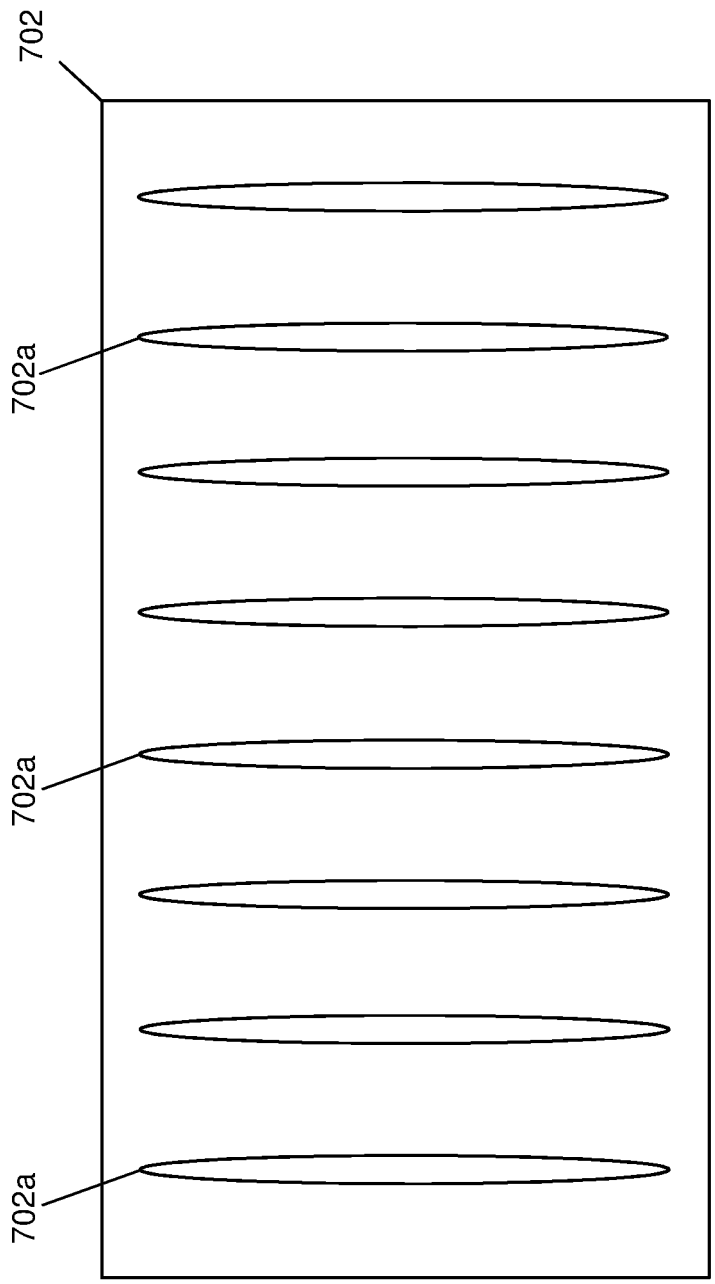
FIG. 7A is a front view illustrating an embodiment of a port entrance blocking element that may be included on the port protection system of the present disclosure.
Figure 7A:
Figure 7B:
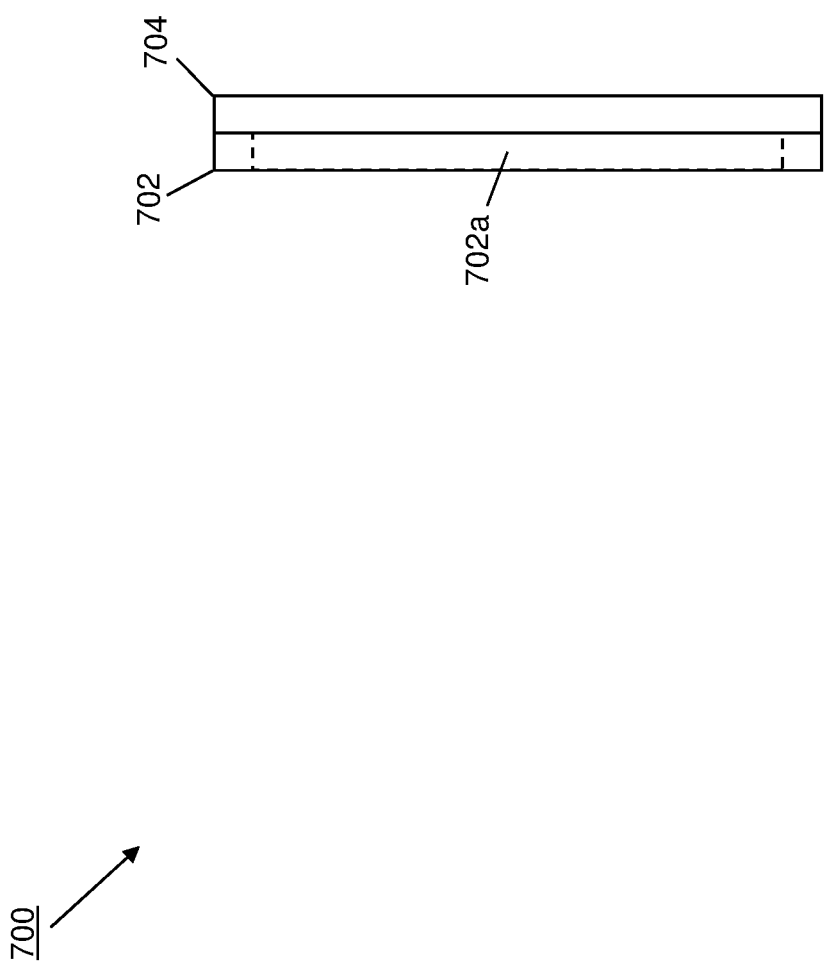
FIG. 7B is a cross-sectional view illustrating an embodiment of the port entrance blocking element of FIG. 7A.

Referring now to FIGS. 7A and 7B, an embodiment of a port entrance blocking element 700 is illustrated that may provide any of the port entrance blocking elements 302d discussed above with reference to FIGS. 3A-3C, the port entrance blocking elements 402e discussed above with reference to FIGS. 4A-4C, and/or the port entrance blocking elements 502b discussed above with reference to FIGS. 5A-5C. In the illustrated embodiment, the port entrance blocking element 700 may include a base 702 that defines a plurality of vertical slit airflow apertures 702a through its width (which is into the page in FIG. 7A), with the vertical slit airflow apertures 702a configured to allow an airflow to enter a port 208 when the port entrance blocking element 700 is positioned in the port protection orientation, discussed above and in further detail below. FIG. 7B illustrates how the port entrance blocking element 700 may include an airflow filter 704 that may be positioned adjacent the base 702 such that any airflow through the vertical slit airflow apertures 702a is filtered by the airflow filter 704. However, one of skill in the art in possession of the present disclosure will appreciate how the airflow filter 704 may be omitted in some embodiments while remaining within the scope of the present disclosure as well. In either embodiment, one of skill in the art in possession of the present disclosure will appreciate how the vertical slit airflow apertures 702a and/or airflow filters 704 may be configured to allow an airflow through the ports 208 (e.g., when the port protection devices that utilize the port entrance blocking elements 700 are in the port protection orientation) that is sufficient to provide a desired level of cooling for one or more components in the computing device that include those ports 208 while also restricting contaminants from entering the ports 208.

Figure 8A:
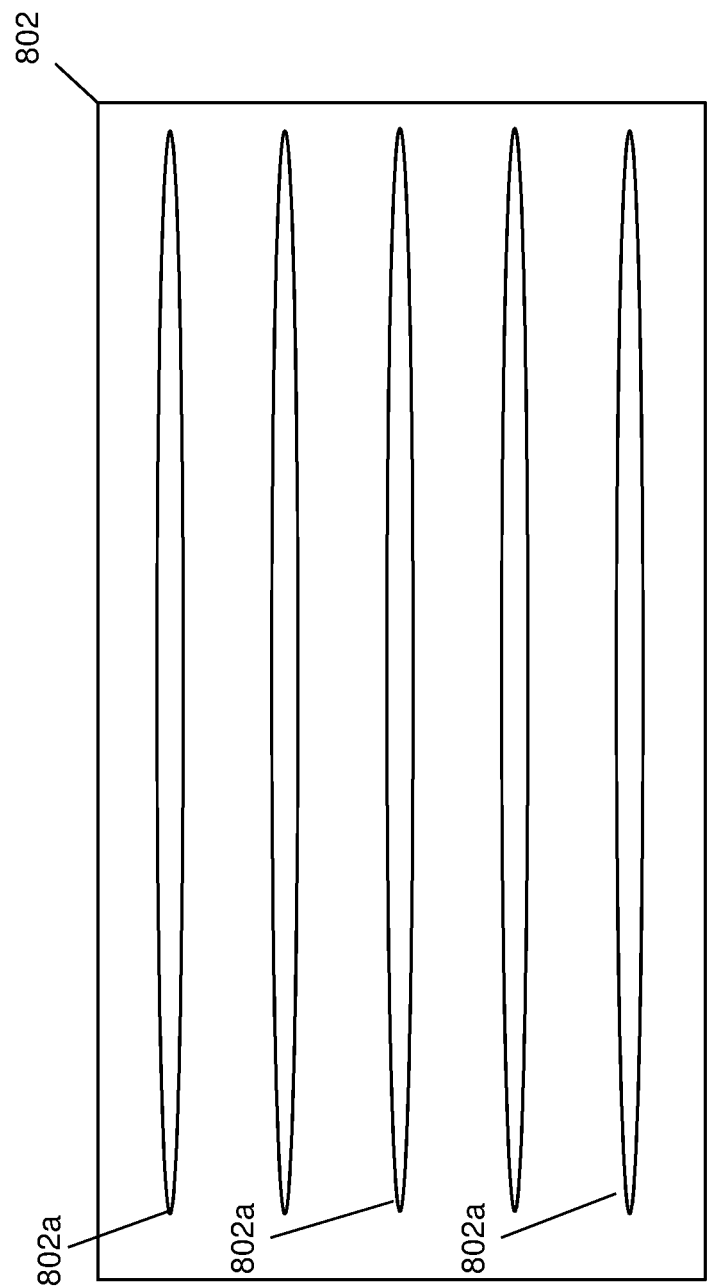
FIG. 8A is a front view illustrating an embodiment of a port entrance blocking element that may be included on the port protection system of the present disclosure.
Figure 8B:
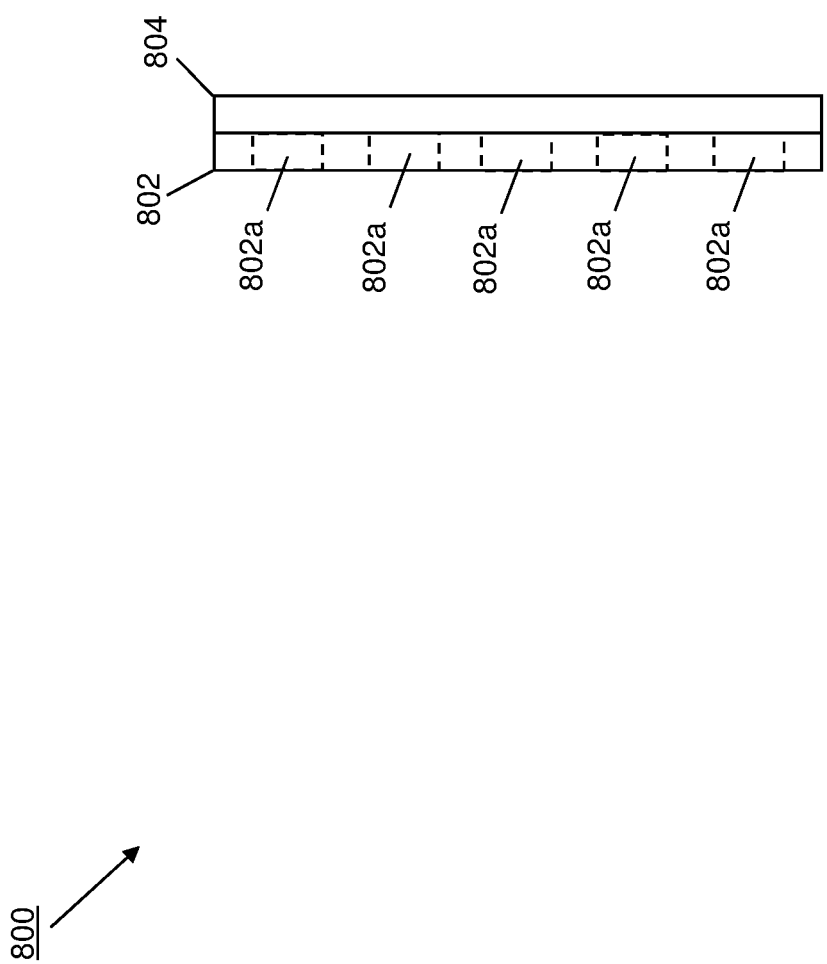
FIG. 8B is a cross-sectional view illustrating an embodiment of the port entrance blocking element of FIG. 8A.

Referring now to FIGS. 8A and 8B, an embodiment of a port entrance blocking element 800 is illustrated that may provide any of the port entrance blocking elements 302d discussed above with reference to Figs. FIGS. 3A-3C, the port entrance blocking elements 402e discussed above with reference to FIGS. 4A-4C, and/or the port entrance blocking elements 502b discussed above with reference to FIGS. 5A-5C. In the illustrated embodiment, the port entrance blocking element 800 may include a base 802 that defines a plurality of horizontal slit airflow apertures 802a through its width (which is into the page in FIG. 8A), with the horizontal slit airflow apertures 802a configured to allow an airflow to enter a port 208 when the port entrance blocking element 800 is positioned in the port protection orientation, discussed above and in further detail below. FIG. 8B illustrates how the port entrance blocking element 800 may include an airflow filter 804 that may be positioned adjacent the base 802 such that any airflow through the horizontal slit airflow apertures 802a is filtered by the airflow filter 804. However, one of skill in the art in possession of the present disclosure will appreciate how the airflow filter 804 may be omitted in some embodiments while remaining within the scope of the present disclosure as well. In either embodiment, one of skill in the art in possession of the present disclosure will appreciate how the horizontal slit airflow apertures 802a and/or airflow filters 804 may be configured to allow an airflow through the ports 208 (e.g., when the port protection devices that utilize the port entrance blocking elements 800 are in the port protection orientation) that is sufficient to provide a desired level of cooling for one or more components in the computing device that include those ports 208 while also restricting contaminants from entering the ports 208.

Figure 9A:
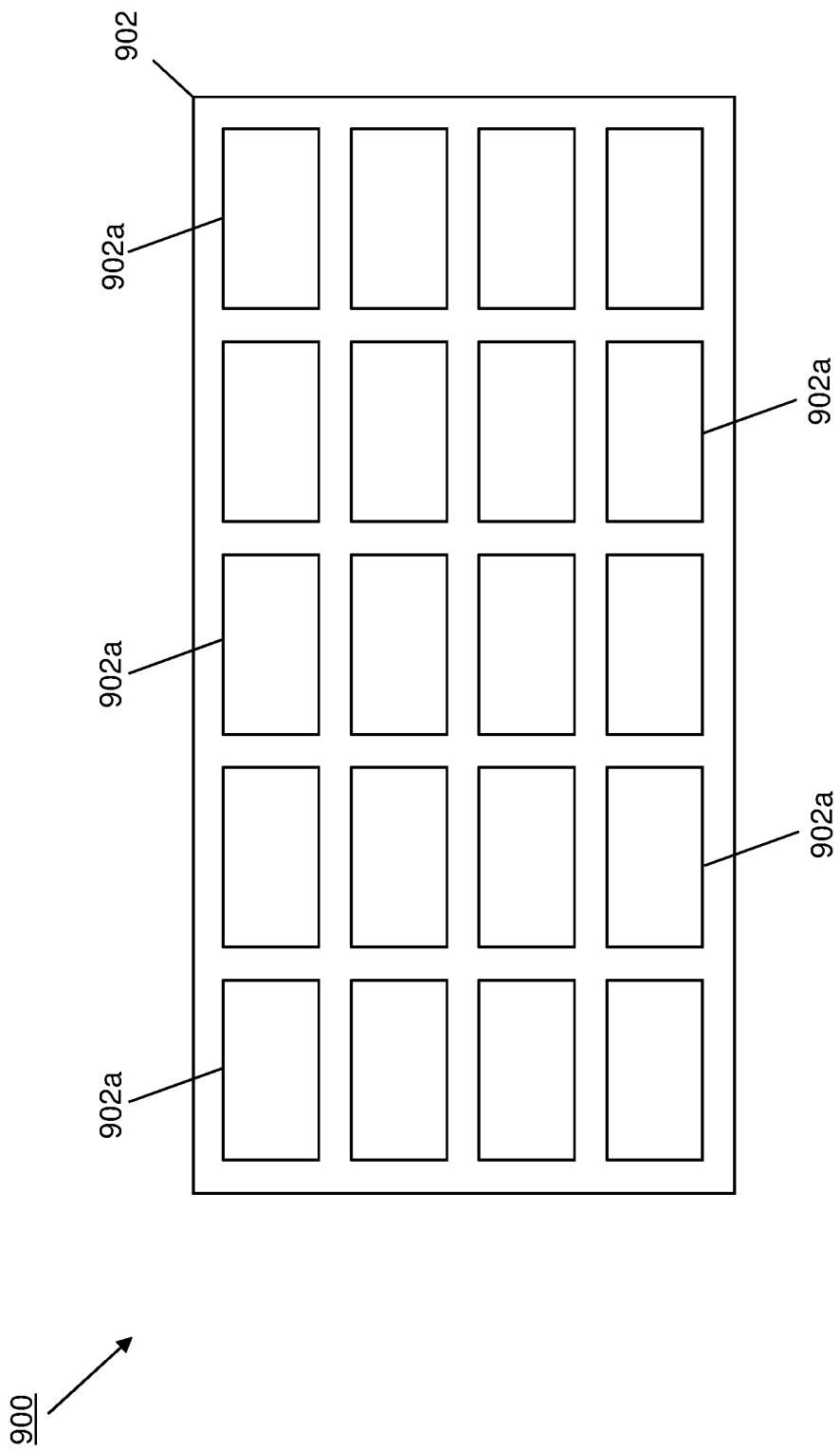
FIG. 9A is a front view illustrating an embodiment of a port entrance blocking element that may be included on the port protection system of the present disclosure.
Figure 9B:
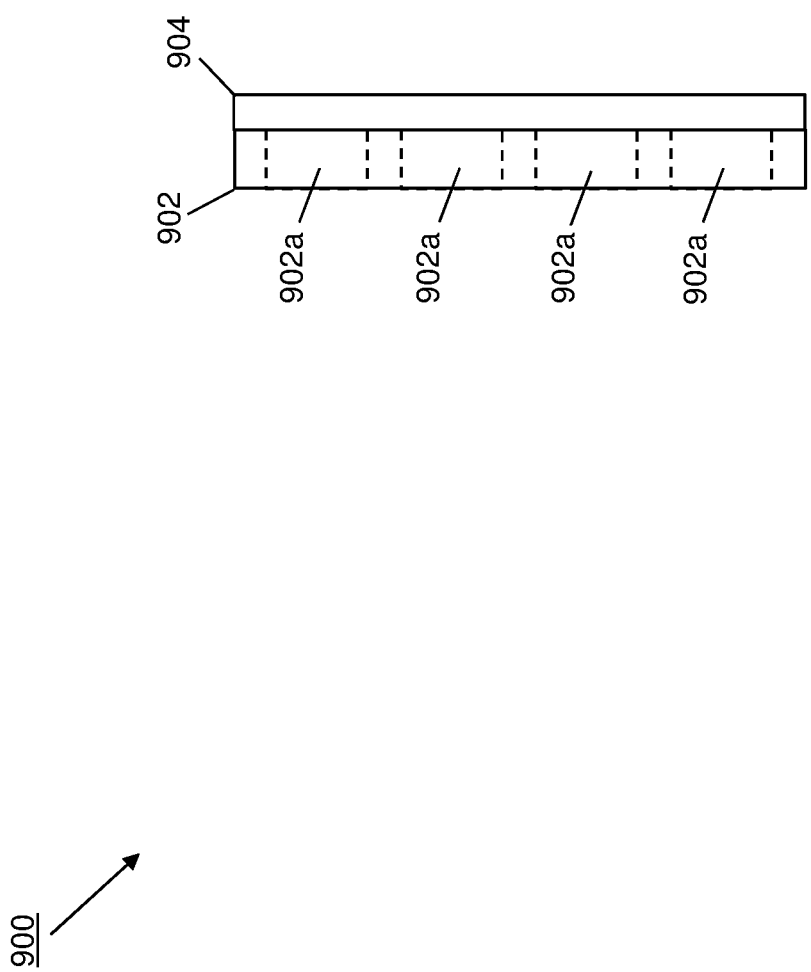
FIG. 9B is a cross-sectional view illustrating an embodiment of the port entrance blocking element of FIG. 9A.

Referring now to FIGS. 9A and 9B, an embodiment of a port entrance blocking element 900 is illustrated that may provide any of the port entrance blocking elements 302d discussed above with reference to Figs. FIGS. 3A-3C, the port entrance blocking elements 402e discussed above with reference to FIGS. 4A-4C, and/or the port entrance blocking elements 502b discussed above with reference to FIGS. 5A-5C. In the illustrated embodiment, the port entrance blocking element 900 may include a base 902 that defines a plurality of rectangular matrix airflow apertures 902a through its width (which is into the page in FIG. 9A), with the rectangular matrix airflow apertures 902a configured to allow an airflow to enter a port 208 when the port entrance blocking element 900 is positioned in the port protection orientation, discussed above and in further detail below. FIG. 9B illustrates how the port entrance blocking element 900 may include an airflow filter 904 that may be positioned adjacent the base 902 such that any airflow through the rectangular matrix airflow apertures 902a is filtered by the airflow filter 904. However, one of skill in the art in possession of the present disclosure will appreciate how the airflow filter 904 may be omitted in some embodiments while remaining within the scope of the present disclosure as well. In either embodiment, one of skill in the art in possession of the present disclosure will appreciate how the rectangular matrix airflow apertures 902a and/or airflow filters 904 may be configured to allow an airflow through the ports 208 (e.g., when the port protection devices that utilize the port entrance blocking elements 900 are in the port protection orientation) that is sufficient to provide a desired level of cooling for one or more components in the computing device that include those ports 208 while also restricting contaminants from entering the ports 208.

Figure 10A:
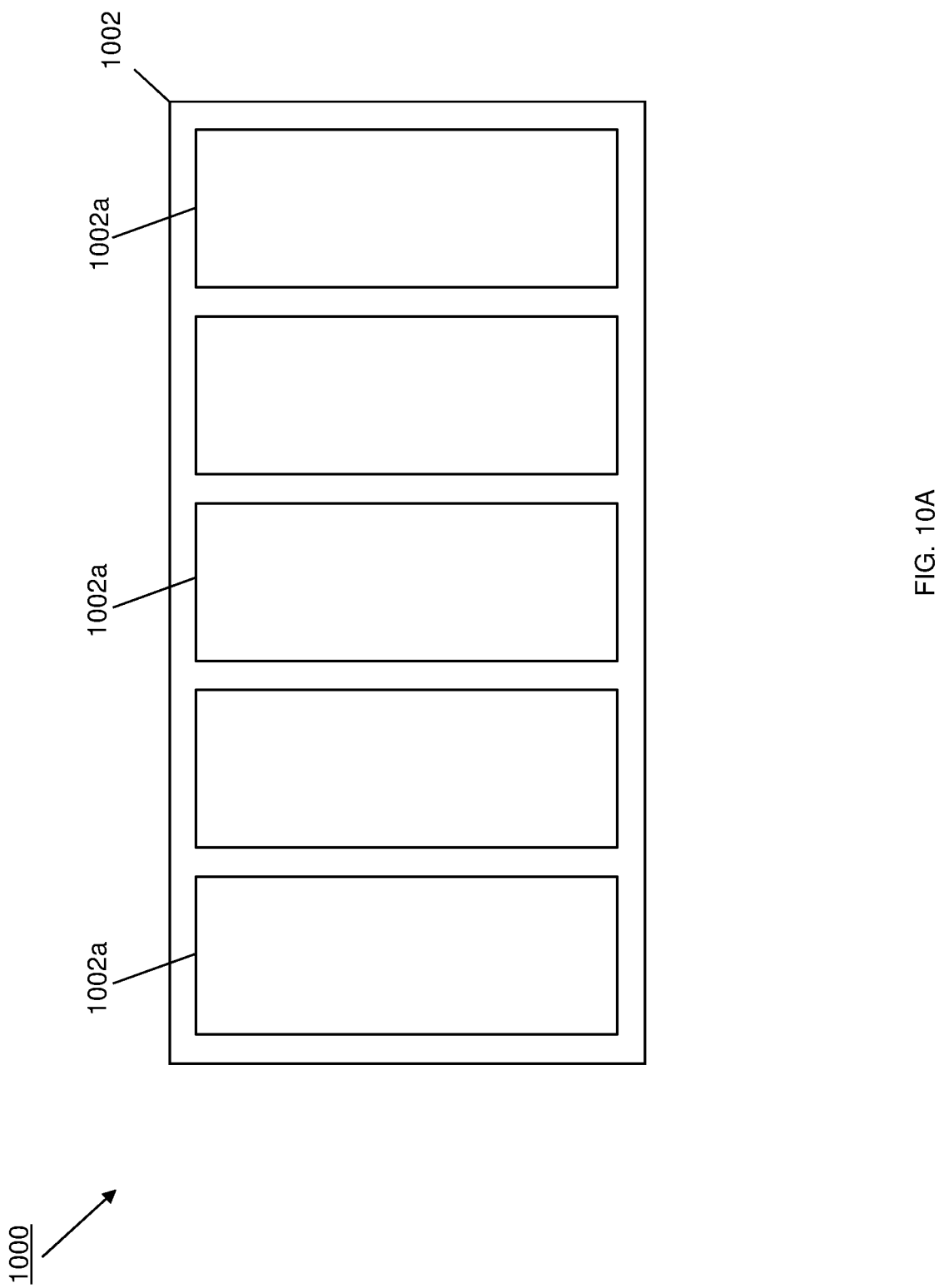
FIG. 10A is a front view illustrating an embodiment of a port entrance blocking element that may be included on the port protection system of the present disclosure.
Figure 10B:
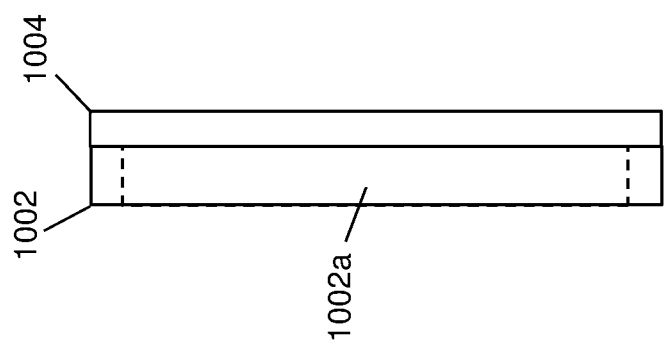
FIG. 10B is a cross-sectional view illustrating an embodiment of the port entrance blocking element of FIG. 10A.

Referring now to FIGS. 10A and 10B, an embodiment of a port entrance blocking element 1000 is illustrated that may provide any of the port entrance blocking elements 302d discussed above with reference to Figs. FIGS. 3A-3C, the port entrance blocking elements 402e discussed above with reference to FIGS. 4A-4C, and/or the port entrance blocking elements 502b discussed above with reference to FIGS. 5A-5C. In the illustrated embodiment, the port entrance blocking element 1000 may include a base 1002 that defines a plurality of vertical rectangular airflow apertures 1002a through its width (which is into the page in FIG. 10A), with the vertical rectangular airflow apertures 1002a configured to allow an airflow to enter a port 208 when the port entrance blocking element 1000 is positioned in the port protection orientation, discussed above and in further detail below. FIG. 10B illustrates how the port entrance blocking element 1000 may include an airflow filter 1004 that may be positioned adjacent the base 1002 such that any airflow through the vertical rectangular airflow apertures 1002a is filtered by the airflow filter 1004. However, one of skill in the art in possession of the present disclosure will appreciate how the airflow filter 1004 may be omitted in some embodiments while remaining within the scope of the present disclosure as well. In either embodiment, one of skill in the art in possession of the present disclosure will appreciate how the vertical rectangular airflow apertures 1002a and/or airflow filters 1004 may be configured to allow an airflow through the ports 208 (e.g., when the port protection devices that utilize the port entrance blocking elements 1000 are in the port protection orientation) that is sufficient to provide a desired level of cooling for one or more components in the computing device that include those ports 208 while also restricting contaminants from entering the ports 208.

Figure 11:
FIG. 11 is a flow chart illustrating an embodiment of a method for protecting a port.

Referring now to FIG. 11, an embodiment of a method 1100 for protecting a port is illustrated. As discussed below, the systems and methods of the present disclosure provide a port protection device for a port that, in the absence of an outside force, is biased into a port protection orientation that provides a port entrance blocking element in a port entrance on that port in order to prevent contaminants from entering that port, while allowing a cable connector on a cable to connect to that port by engaging the port protection device and moving it from the port protection orientation to a cable connection orientation that allows the cable connector to connect to the port. For example, the port protection device of the present disclosure includes a blocking element movement subsystem that may be coupled to a port that defines a port entrance, and a port entrance blocking element that is connected to the blocking element movement subsystem and that defines airflow aperture(s). When the blocking element movement subsystem is coupled to the port, the blocking element movement subsystem allows the port entrance blocking element to be positioned in a port protection orientation immediately adjacent the port entrance such that airflow is restricted to entering the port via the airflow aperture(s). When the blocking element movement subsystem is coupled to the port, the blocking element movement subsystem also allows the port entrance blocking element to move from the port protection orientation to a cable connector orientation in response to engagement with a cable connector so that the cable connector may move through the port entrance to connect to the port. As such, ports that are not connected to a cable connector will be protected from contaminants entering those ports while still allowing airflow through the ports to cool computing components.

The method 1100 begins at block 1102 where a port entrance blocking element is positioned in a port protection orientation immediately adjacent a port entrance of a port. As discussed above, the port entrance blocking element on any port protection device may be biased into a port protection orientation in which the pot blocking element is positioned immediately adjacent a port entrance on a port. For example, with reference back to FIGS. 3A-3C and in an embodiment of block 1102, the port entrance blocking elements 302d on each port protection device 302 are illustrated as having been biased into a port protection orientation via a gravitational force such that they positioned adjacent/in the port entrance 208a of each port 208 on the computing device 300. Similarly, with reference back to FIGS. 4A-4C and in an embodiment of block 1102, the port entrance blocking elements 402e on each port protection device 402 are illustrated as having been biased into a port protection orientation via a spring force such that they positioned adjacent/in the port entrance 208a of each port 208 on the computing device 400. Similarly as well, with reference back to FIGS. 5A-5C and in an embodiment of block 1102, the port entrance blocking elements 502b on each port protection device 502 are illustrated as having been biased into a port protection orientation via a gravitational or spring force such that they positioned adjacent/in the port entrance 208a of each port 208 on the computing device 200.

The method 1100 then proceeds to block 1104 where the port entrance blocking element restricts airflow from entering the port via airflow apertures defined by the port entrance blocking element. As will be appreciated by one of skill in the art in possession of the present disclosure, in an embodiment of block 1104 and with the port entrance blocking elements 302d/402e/502b on each port protection device 302/402/502 located adjacent the port entrance 208a on the ports 208, airflow is restricted from entering those ports 208 via airflow apertures defined by the port entrance blocking elements 302d/402e/502b. In some embodiments, those airflow apertures may be provided by the gaps discussed above that may exist between the port entrance blocking elements 302d/402e/502b and the port entrance 208a on the ports 208. However, in other embodiments, those airflow apertures may be provided by the circular airflow apertures 602a on the port entrance blocking element 600, the vertical slit airflow apertures 702a on the port entrance blocking element 700, the horizontal slit airflow apertures 802a on the port entrance blocking element 800, the rectangular matrix airflow apertures 902a on the port entrance blocking element 900, and/or the vertical rectangular airflow apertures 1002a on the port entrance blocking element 1000. Furthermore, in some examples, the airflow entering the ports 208 via the airflow apertures 602a/702a/802a/902a/1002a defined by the port entrance blocking elements 600/700/800/900/1000 may be filtered by the airflow filters 604/704/804/904/1004 in embodiments when those airflow filters are included on the port entrance blocking elements, and those airflow filters may be changed periodically to ensure a desired level of airflow filtering. As such, with the port entrance blocking elements in the port protection orientation, contaminants may be restricted or prevented from entering the ports 208 via the airflow apertures defined by the port entrance blocking elements and/or the airflow filters included on those port entrance blocking elements.

Figure 12A:
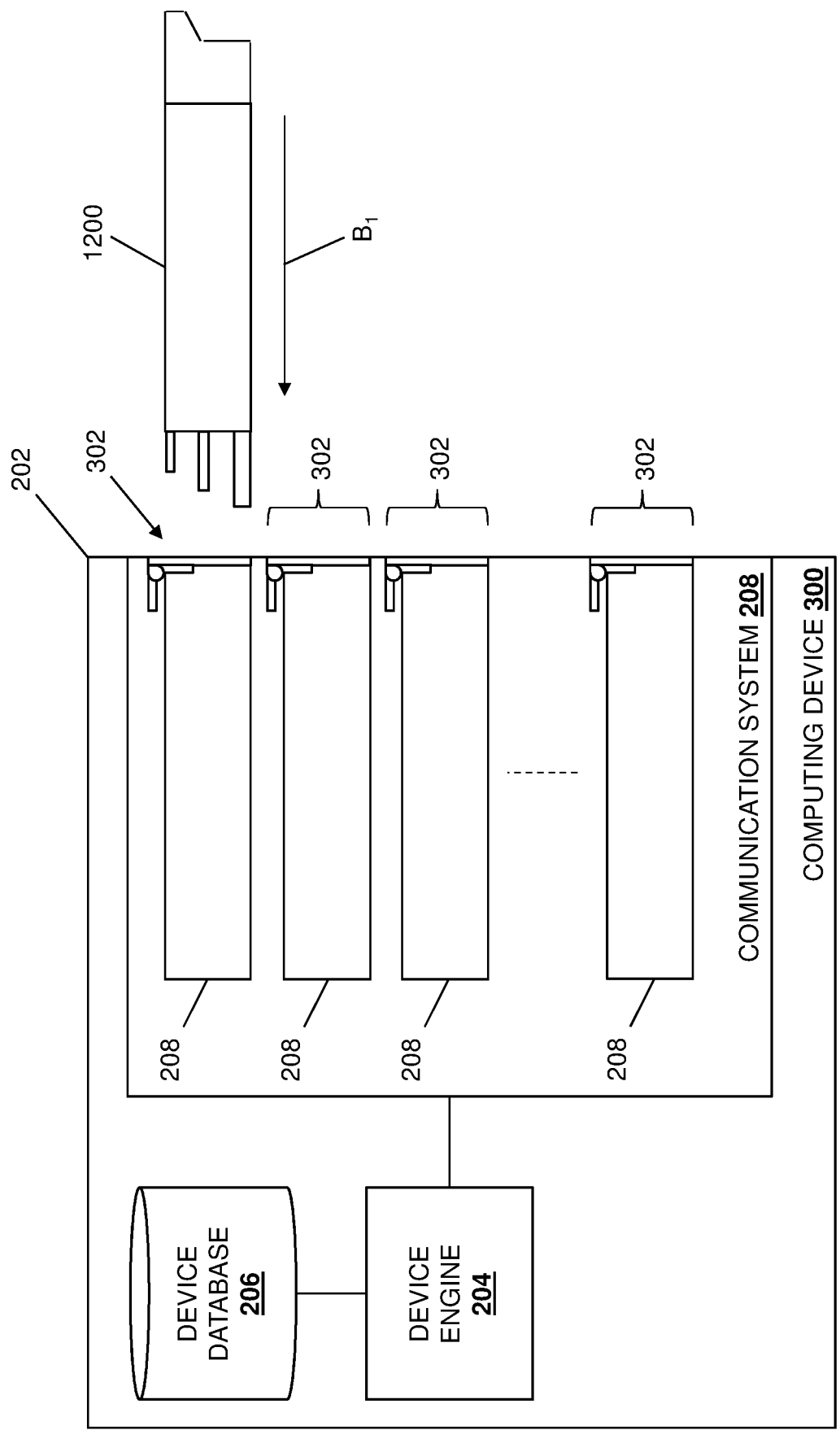
FIG. 12A is a schematic view illustrating an embodiment of a cable connector being connected to the computing device of FIGS. 3A and 3B.
Figure 12B:
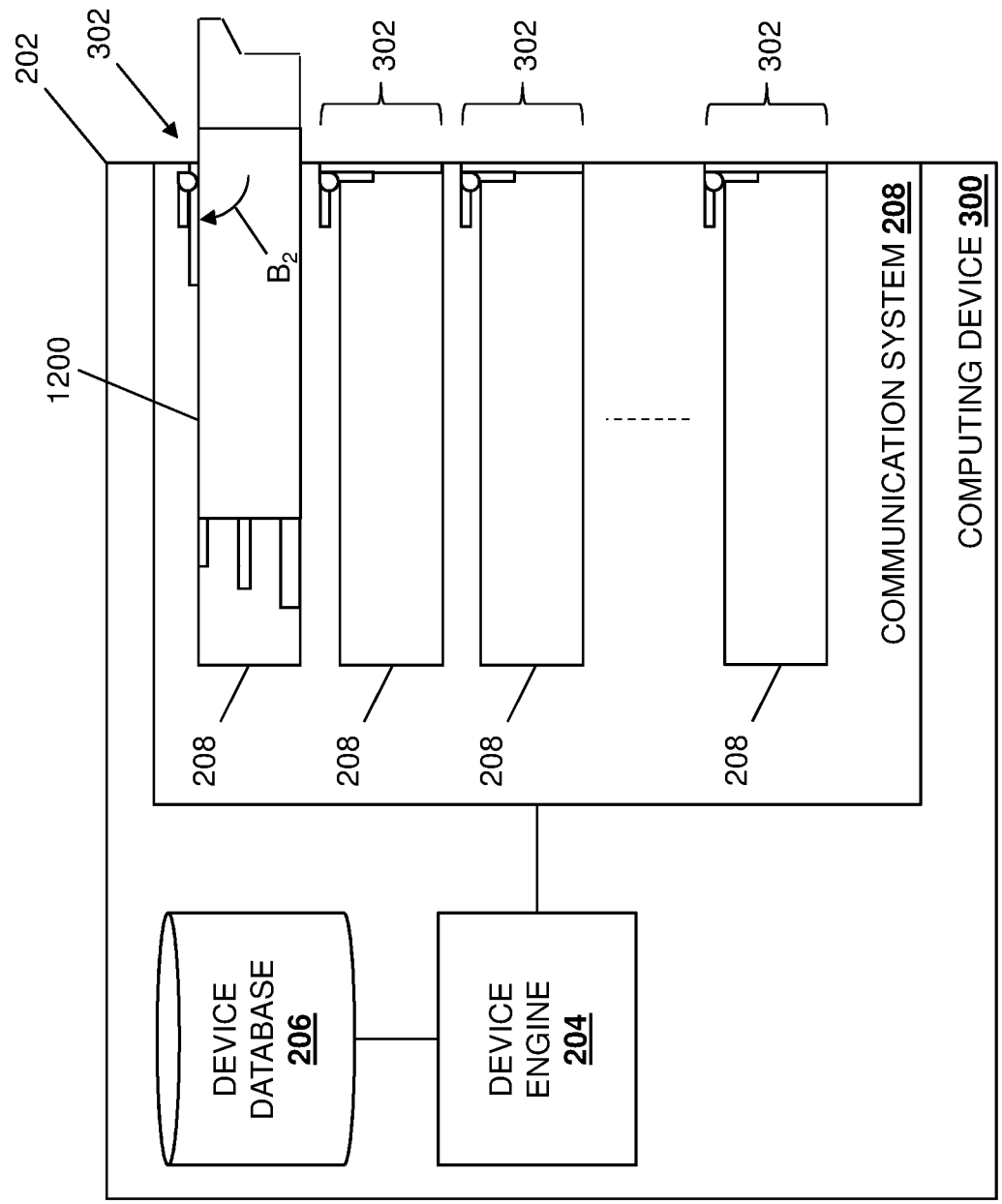
FIG. 12B is a schematic view illustrating an embodiment of a cable connector connected to the computing device of FIGS. 3A and 3B.

The method 1100 then proceeds to block 1106 where a cable connector engages and moves the port entrance blocking element from the port protection orientation to a cable connector orientation to connect to the port. As discussed above, the port entrance blocking element on any port protection device is configured to be moved from the port protection orientation to a cable connector orientation in response to engagement with a cable connector, and that cable connector orientation allows the cable connector to connect the port adjacent that port protection device. With reference to FIGS. 12A and 12B, in an embodiment of block 1106, a cable connector 1200 is illustrated that one of skill in the art in possession of the present disclosure will recognize is a transceiver device that is configured to connect to a cable. However, while a transceiver device that connects cables to the computing device 300 is illustrated and discussed in the specific examples provided below, one of skill in the art in possession of the present disclosure will appreciate how other cable connectors (e.g., Ethernet cable connectors, fibre optic cable connectors, Direct Attach Copper (DAC) cable connectors, etc.) may be utilized with the port protection system of the present disclosure while remaining within its scope as well.

As illustrated in FIG. 12A, the cable connector 1200 may be positioned adjacent the port entrance 208a of a port 208 that includes the port entrance blocking element 302d positioned in/adjacent that port entrance 208a, and then moved in a direction $B_1$ such that the cable connector 1200 engages the port entrance blocking element 302d. In response to engagement with the cable connector 1200 and its continued movement in the direction $B_1$, the port entrance blocking element 302d will overcome the gravitational force that biases it into the port protection orientation illustrated in FIG. 12A, and will rotate about the moveable coupling 302a via its mounting to the blocking element mounting element 302c and in a direction $B_2$ into the cable connector orientation illustrated in FIG. 12B. As such, the continued movement of the cable connector 1200 in the direction $B_1$ will allow the cable connector 1200 to enter the port 208 and connect to connector elements within the port 208 (not illustrated) such that the cable connector 1200 may transmit data between a cable connected to the cable connector 1200 (not illustrated) and the computing device 300 (e.g., via the device engine 204). As will be appreciated by one of skill in the art in possession of the present disclosure, in the event the cable connector 1200 is moved in a direction opposite the direction $B_1$, it will be disconnected from the port 208 and removed from the port 208, allowing the gravitational force discussed above to cause the port entrance blocking element 302d to move in a direction opposite the direction $B_2$ and back into the port protection orientation illustrated in FIG. 12A.

Figure 13A:
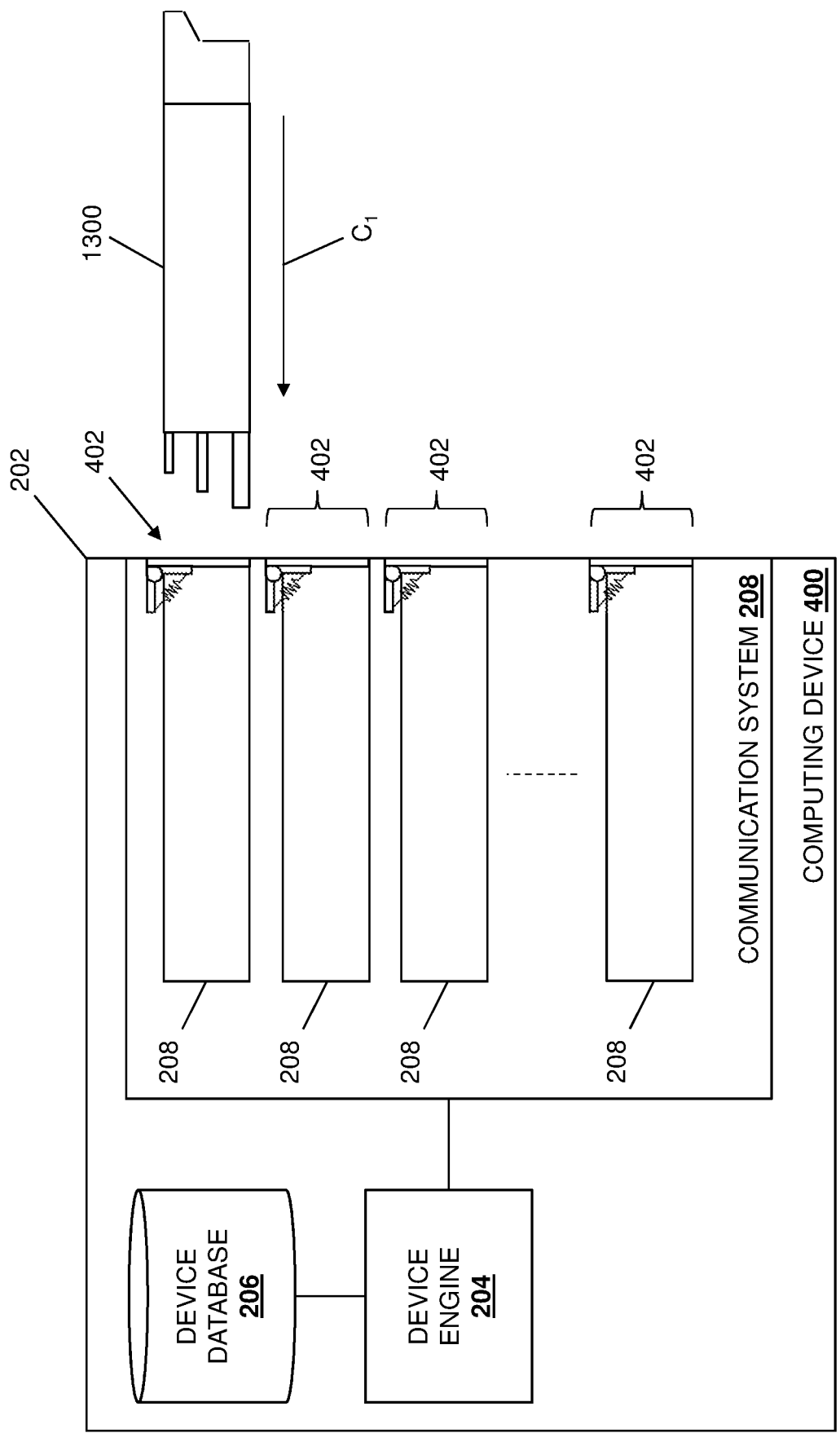
FIG. 13A is a schematic view illustrating an embodiment of a cable connector being connected to the computing device of FIGS. 4A and 4B.
Figure 13B:
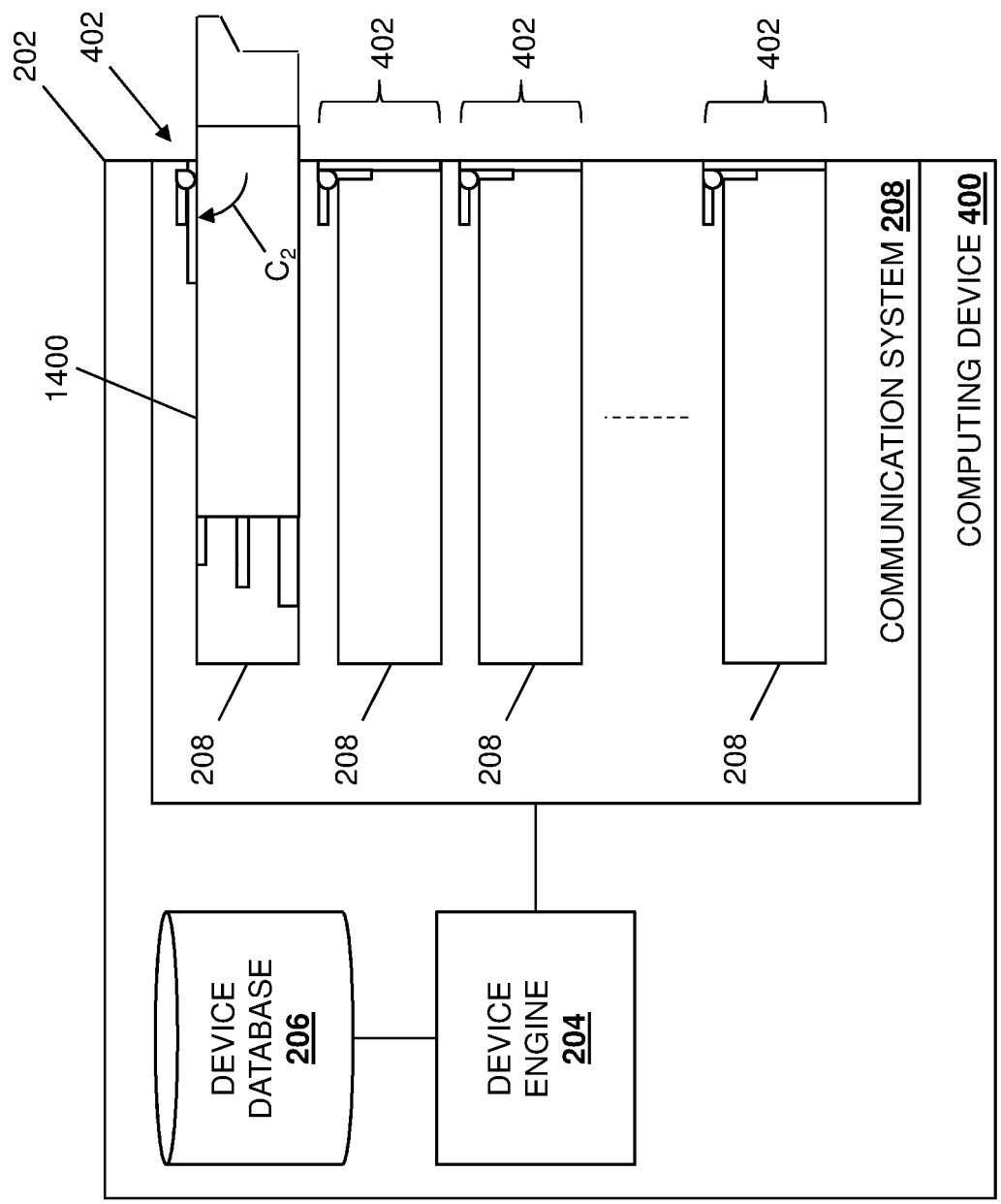
FIG. 13B is a schematic view illustrating an embodiment of a cable connector connected to the computing device of FIGS. 4A and 4B.

With reference to FIGS. 13A and 13B, in an embodiment of block 1106, a cable connector 1300 is illustrated that one of skill in the art in possession of the present disclosure will recognize is a transceiver device that is configured to connect to a cable. However, while a transceiver device that connects cables to the computing device 400 is illustrated and discussed in the specific examples provided below, one of skill in the art in possession of the present disclosure will appreciate how other cable connectors (e.g., Ethernet cable connectors, fibre optic cable connectors, Direct Attach Copper (DAC) cable connectors, etc.) may be utilized with the port protection system of the present disclosure while remaining within its scope as well.

As illustrated in FIG. 13A, the cable connector 1300 may be positioned adjacent the port entrance 208a of a port 208 that includes the port entrance blocking element 402e positioned in/adjacent that port entrance 208a, and then moved in a direction $C_1$ such that the cable connector 1300 engages the port entrance blocking element 402e. In response to engagement with the cable connector 1300 and its continued movement in the direction $C_1$, the port entrance blocking element 402e will overcome the spring force from the spring device 402d that biases it into the port protection orientation illustrated in FIG. 13A, and will rotate about the moveable coupling 402a via its mounting to the blocking element mounting element 402c and in a direction $C_2$ into the cable connector orientation illustrated in FIG. 13B. As such, the continued movement of the cable connector 1300 in the direction $C_1$ will allow the cable connector 1300 to enter the port 208 and connect to connector elements within the port 208 (not illustrated) such that the cable connector 1300 may transmit data between a cable connected to the cable connector 1300 (not illustrated) and the computing device 400 (e.g., via the device engine 204). As will be appreciated by one of skill in the art in possession of the present disclosure, in the event the cable connector 1300 is moved in a direction opposite the direction $C_1$, it will be disconnected from the port 208 and removed from the port 208, allowing the spring force from the spring device 402d discussed above to cause the port entrance blocking element 402e to move in a direction opposite the direction $C_2$ and back into the port protection orientation illustrated in FIG. 13A.

Figure 14A:
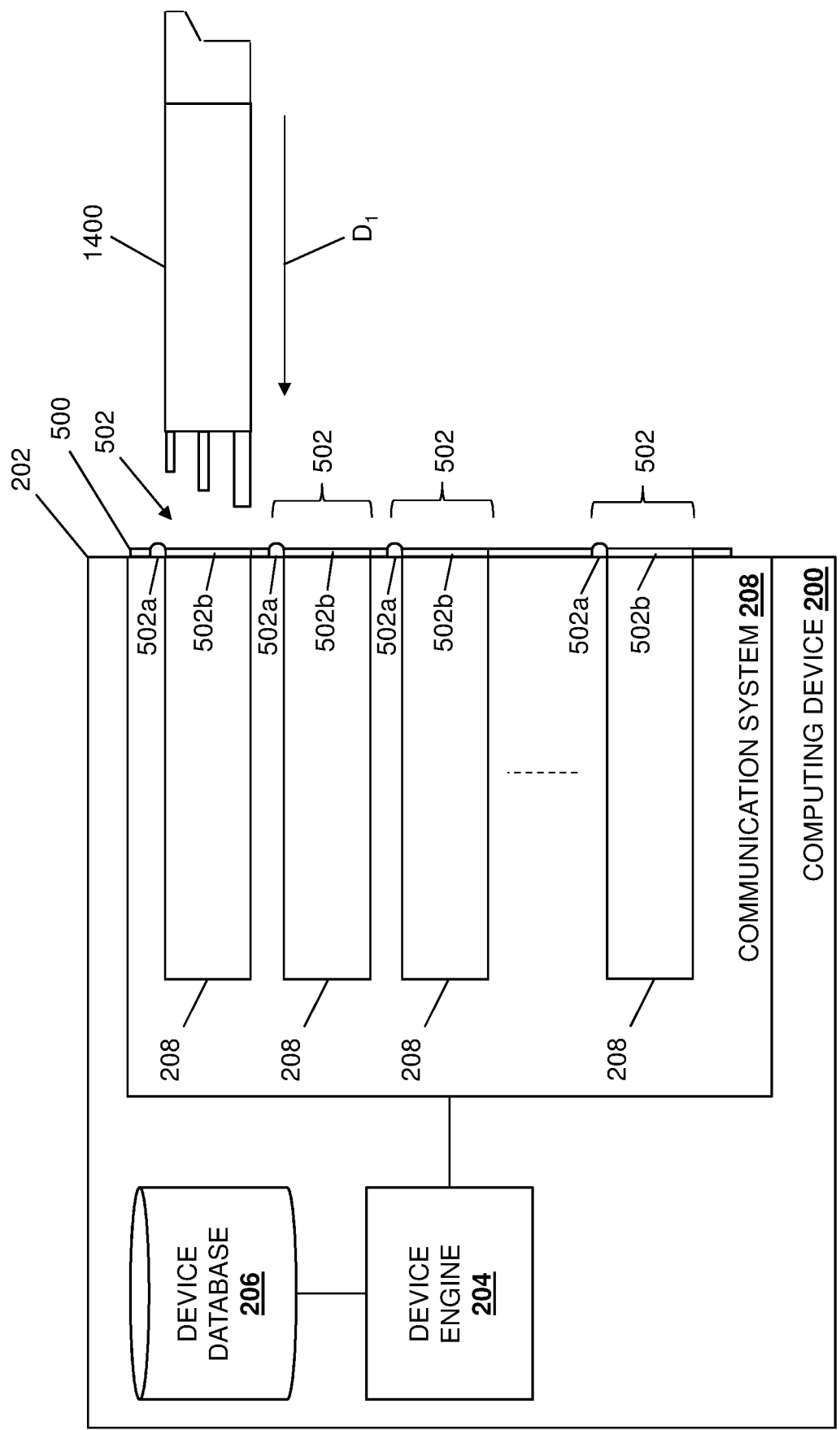
FIG. 14A is a schematic view illustrating an embodiment of a cable connector being connected to the computing device of FIGS. 5A and 5B.
Figure 14B:
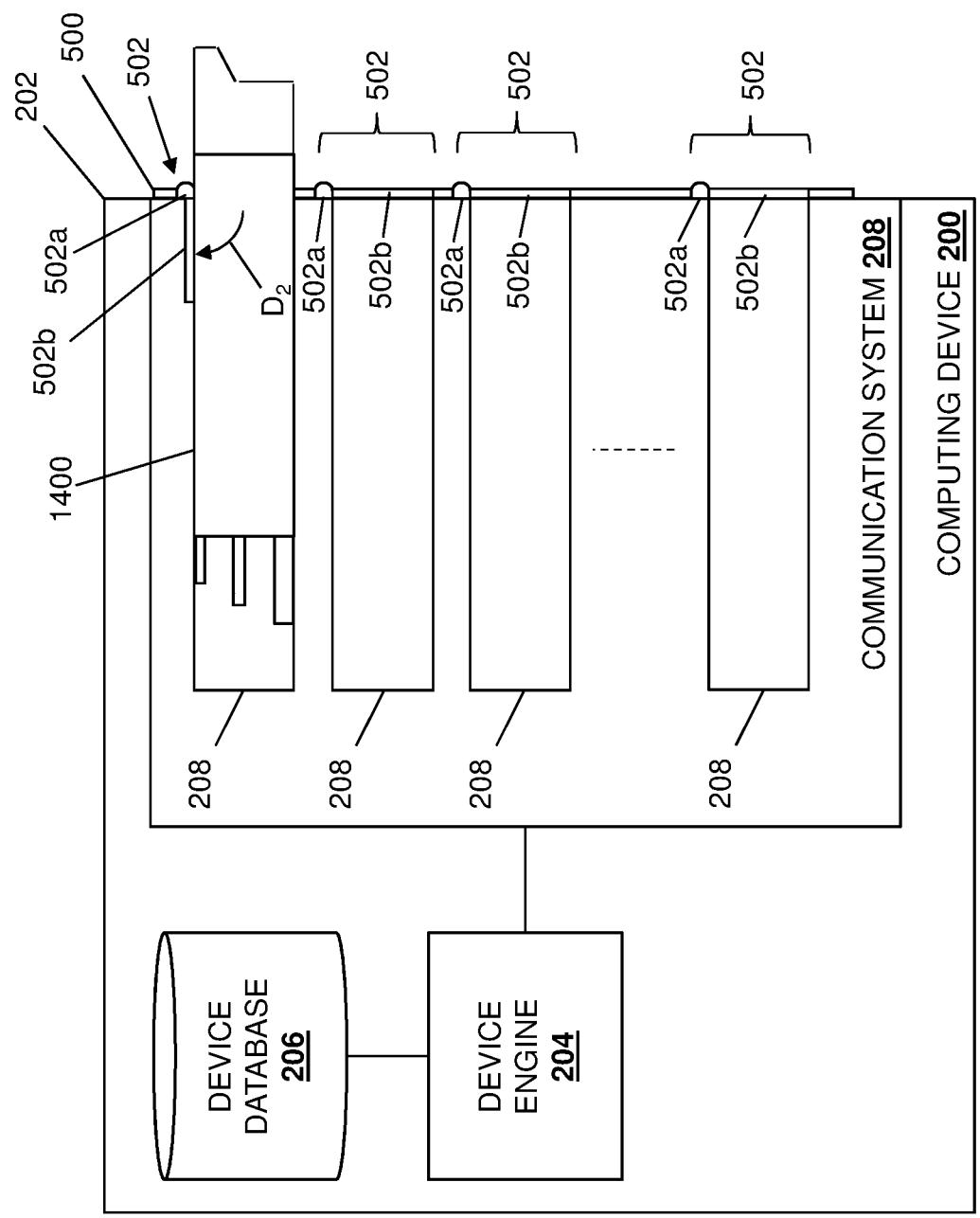
FIG. 14B is a schematic view illustrating an embodiment of a cable connector connected to the computing device of FIGS. 5A and 5B.

With reference to FIGS. 14A and 14B, in an embodiment of block 1106, a cable connector 1400 is illustrated that one of skill in the art in possession of the present disclosure will recognize is a transceiver device that is configured to connect to a cable. However, while a transceiver device that connects cables to the computing device 200 is illustrated and discussed in the specific examples provided below, one of skill in the art in possession of the present disclosure will appreciate how other cable connectors (e.g., Ethernet cable connectors, fibre optic cable connectors, Direct Attach Copper (DAC) cable connectors, etc.) may be utilized with the port protection system of the present disclosure while remaining within its scope as well.

As illustrated in FIG. 14A, the cable connector 1400 may be positioned adjacent the port entrance 208a of a port 208 that includes the port entrance blocking element 502b positioned in/adjacent that port entrance 208a, and then moved in a direction $D_1$ such that the cable connector 1400 engages the port entrance blocking element 502b. In response to engagement with the cable connector 1400 and its continued movement in the direction $D_1$, the port entrance blocking element 502b will overcome the biasing force (e.g., a gravitational force, a spring force, etc.) that biases it into the port protection orientation illustrated in FIG. 14A, and will rotate about the moveable coupling 502a and in a direction D2 into the cable connector orientation illustrated in FIG. 14B. As such, the continued movement of the cable connector 1400 in the direction $D_1$ will allow the cable connector 1400 to enter the port 208 and connect to connector elements within the port 208 (not illustrated) such that the cable connector 1400 may transmit data between a cable connected to the cable connector 1400 (not illustrated) and the computing device 200 (e.g., via the device engine 204). As will be appreciated by one of skill in the art in possession of the present disclosure, in the event the cable connector 1400 is moved in a direction opposite the direction $D_1$, it will be disconnected from the port 208 and removed from the port 208, allowing the biasing force discussed above to cause the port entrance blocking element 502b to move in a direction opposite the direction D2 and back into the port protection orientation illustrated in FIG. 14A.

Thus, systems and methods have been described that provide a port protection device for a port that, in the absence of an outside force, is biased into a port protection orientation that provides a port entrance blocking element in a port entrance on that port in order to prevent contaminants from entering that port, while allowing a cable connector on a cable to connect to that port by engaging the port protection device and moving it from the port protection orientation to a cable connection orientation that allows the cable connector to connect to the port. For example, the port protection device of the present disclosure includes a blocking element movement subsystem that may be coupled to a port that defines a port entrance, and a port entrance blocking element connected to the blocking element movement subsystem and defining airflow aperture(s). When the blocking element movement subsystem is coupled to the port, the blocking element movement subsystem allows the port entrance blocking element to be positioned in a port protection orientation immediately adjacent the port entrance such that airflow is restricted to entering the port via the airflow aperture(s). When the blocking element movement subsystem is coupled to the port, the blocking element movement subsystem also allows the port entrance blocking element to move from the port protection orientation to a cable connector orientation in response to engagement with a cable connector so that the cable connector may move through the port entrance to connect to the port. As such, ports that are not connected to a cable connector will be protected from contaminants entering those ports while still allowing airflow through the ports to cool computing components.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A port protection device, comprising:
  a blocking element movement subsystem that is configured to be coupled to a port that defines a port entrance; and
  a port entrance blocking element that is connected to the blocking element movement subsystem and that defines at least one airflow aperture, wherein the blocking element movement subsystem is configured, when the blocking element movement subsystem is coupled to the port, to allow the port entrance blocking element to:
- be positioned in a port protection orientation immediately adjacent the port entrance such that airflow is restricted to entering the port via the at least one airflow aperture defined by the port entrance blocking element; and
- move, in response to a cable connector engaging the port entrance blocking element and moving through the port entrance and into the port, from the port protection orientation to a cable connector orientation that allows the cable connector to connect to the port.

2. The system of claim 1, wherein the blocking element movement subsystem is configured to allow the port entrance blocking element to move into the port protection orientation in response to gravitation force.

3. The system of claim 1, wherein the blocking element movement subsystem includes a spring device that is configured to provide a spring force that moves the port entrance blocking element into the port protection orientation.

4. The system of claim 1, wherein the port protection device is integrated with the port on a computing device.

5. The system of claim 1, further comprising:
a chassis coupling base, wherein the port protection device is one of a plurality of port protection devices that are included on the chassis coupling base, and wherein the chassis coupling base is configured to couple to a chassis that includes the port in order to couple the blocking element movement subsystem to the port.

6. The system of claim 1, wherein the port entrance blocking element includes an airflow filter that is configured to filter the airflow entering the port via the at least one airflow aperture when the port entrance blocking element is positioned in the port protection orientation.

7. An Information Handling System (IHS), comprising:
a chassis;
a processing system that is included in the chassis;
a plurality of ports that are included on the chassis, coupled to the processing system, and that each define a respective port entrance; and
a respective port protection device coupled to each of the plurality of ports, wherein each port protection device includes:
a blocking element movement subsystem; and
a port entrance blocking element that is connected to the blocking element movement subsystem and that defines at least one airflow aperture, wherein the blocking element movement subsystem is configured to allow the port entrance blocking element to:
be positioned in a port protection orientation immediately adjacent the port entrance defined by the port to which that port protection device is coupled such that airflow is restricted to entering that port via the at least one airflow aperture defined by the port entrance blocking element; and
move, in response to a cable connector engaging the port entrance blocking element and moving through the port entrance defined by the port to which that port protection device is coupled and into that port, from the port protection orientation to a cable connector orientation that allows the cable connector to connect to that port.

8. The IHS of claim 7, wherein each blocking element movement subsystem is configured to allow the port entrance blocking element to move into the port protection orientation in response to gravitation force.

9. The IHS of claim 7, wherein each blocking element movement subsystem includes a spring device that is configured to provide a spring force that moves the port entrance blocking element into the port protection orientation.

10. The IHS of claim 7, wherein the respective port protection devices are integrated with each of the plurality of ports on the computing device.

11. The IHS of claim 7, further comprising:
a chassis coupling base, wherein the respective port protection devices are included on the chassis coupling base, and wherein the chassis coupling base is configured to couple to the chassis that includes the plurality of ports in order to couple the respective port protection device to each of the plurality of ports.

12. The IHS of claim 7, wherein each port entrance blocking element includes an airflow filter that is configured to filter the airflow entering the port via the at least one airflow aperture when the port entrance blocking element is positioned in the port protection orientation.

13. The IHS of claim 7, wherein the computing device is a switch device, and wherein the cable connector is a transceiver device.

14. A method for protecting a port, comprising:
positioning, by a blocking element movement subsystem on a port protection device that is coupled to a port that defines a port entrance, a port entrance blocking element that is coupled to the blocking element movement subsystem in a port protection orientation immediately adjacent the port entrance such that airflow is restricted to entering the port via at least one airflow aperture defined by the port entrance blocking element; and
moving, by the blocking element movement subsystem in response to a cable connector engaging the port entrance blocking element and moving through the port entrance and into the port, the port entrance blocking element from the port protection orientation to a cable connector orientation that allows the cable connector to connect to the port.

15. The method of claim 14, further comprising:
moving, by the blocking element movement subsystem and in response to gravitation force, the port entrance blocking element into the port protecting orientation.

16. The method of claim 14, further comprising:
moving, by the blocking element movement subsystem and in response to spring force provided by a spring device included on the blocking element movement subsystem, the port entrance blocking element into the port protecting orientation.

17. The method of claim 14, wherein the port protection device is integrated with the port on the computing device.

18. The method of claim 14, further comprising:
coupling, by a chassis coupling base that includes a plurality of port protection devices, to a chassis that includes the port in order to couple the blocking element movement subsystem to the port.

19. The method of claim 14, further comprising:
filtering, by an airflow filter on the port entrance blocking element, the airflow entering the port via the at least one airflow aperture when the port entrance blocking element is positioned in the port protection orientation.

20. The method of claim 14, further comprising:
wherein the port is included on a switch device, and
wherein the cable connector is a transceiver device.

\* \* \* \* \*